United States Patent
Gustavsson et al.

(10) Patent No.: US 9,850,629 B2
(45) Date of Patent: Dec. 26, 2017

(54) CONTROL METHOD AND SYSTEM FOR A SAWING MACHINE

(75) Inventors: Conny Gustavsson, Hägersten (SE); Hasse Hultman, Handen (SE); Lars Lindén, Gävle (SE); Jim Frölander, Viksjöfors (SE)

(73) Assignee: DellCron AB, Stockholm (SE)

( * ) Notice: Subject to any disclaimer, the term of this patent is extended or adjusted under 35 U.S.C. 154(b) by 1051 days.

(21) Appl. No.: 13/884,551

(22) PCT Filed: Nov. 10, 2011

(86) PCT No.: PCT/SE2011/051347
§ 371 (c)(1),
(2), (4) Date: Aug. 20, 2013

(87) PCT Pub. No.: WO2012/064273
PCT Pub. Date: May 18, 2012

(65) Prior Publication Data
US 2013/0325160 A1 Dec. 5, 2013

(30) Foreign Application Priority Data

Nov. 10, 2010 (SE) ........................................ 1051177
Aug. 5, 2011 (SE) ........................................ 1150732
Aug. 19, 2011 (SE) ........................................ 1100598

(51) Int. Cl.
*G05D 3/10* (2006.01)
*E01C 23/09* (2006.01)
(Continued)

(52) U.S. Cl.
CPC ............ *E01C 23/09* (2013.01); *B23D 59/001* (2013.01); *B23D 59/008* (2013.01); *B23D 61/18* (2013.01);
(Continued)

(58) Field of Classification Search
CPC ... E02F 5/101; E02F 9/245; E02F 5/08; E02F 5/10; E02F 5/00; E02F 5/12; F16L 1/028;
(Continued)

(56) References Cited

U.S. PATENT DOCUMENTS 6,039,098 A * 3/2000 Kennedy ................. B27B 1/007
144/242.1
7,333,922 B2 * 2/2008 Cannon ................... G07C 5/008
700/108
(Continued)

*Primary Examiner* — Nga X Nguyen
(74) *Attorney, Agent, or Firm* — Blank Rome LLP

(57) ABSTRACT

The present invention relates to a control method in a system comprising —a server unit having computer means, communication means and a first data base, said first data base including positioning data and a plurality of work orders, wherein said work orders are related to said positioning data; and —a sawing machine having computer means and communication means, and being arranged for sawing trenches in an area; said method comprising the steps of: —transmitting, by said server unit, a first data flow A comprising a first work order to said sawing machine; and —controlling said sawing machine by means of said first work order. Furthermore, the invention also relates to a system thereof.

27 Claims, 13 Drawing Sheets

(51) Int. Cl.
| | |
|---|---|
| E02F 5/10 | (2006.01) |
| E02F 5/12 | (2006.01) |
| E02F 9/24 | (2006.01) |
| G02B 6/50 | (2006.01) |
| H02G 1/06 | (2006.01) |
| H02G 9/06 | (2006.01) |
| B23D 59/00 | (2006.01) |
| B23D 61/18 | (2006.01) |
| F16L 1/032 | (2006.01) |
| E02F 5/08 | (2006.01) |
| E02F 5/00 | (2006.01) |
| F16L 1/028 | (2006.01) |
| E02D 27/46 | (2006.01) |
| E02F 5/18 | (2006.01) |

(52) U.S. Cl.
CPC ............... *E02D 27/46* (2013.01); *E02F 5/00* (2013.01); *E02F 5/08* (2013.01); *E02F 5/10* (2013.01); *E02F 5/101* (2013.01); *E02F 5/12* (2013.01); *E02F 5/18* (2013.01); *E02F 9/245* (2013.01); *F16L 1/028* (2013.01); *F16L 1/032* (2013.01); *G02B 6/504* (2013.01); *G05D 3/10* (2013.01); *H02G 1/06* (2013.01); *H02G 9/06* (2013.01); *Y10T 83/175* (2015.04); *Y10T 83/849* (2015.04); *Y10T 83/852* (2015.04); *Y10T 83/866* (2015.04); *Y10T 83/929* (2015.04); *Y10T 83/9457* (2015.04)

(58) Field of Classification Search
CPC ........... F16L 1/032; G02B 6/504; H02G 1/06; H02G 9/06; G05D 3/10; B23D 59/001; B23D 59/008; B23D 61/18; G07C 5/008
USPC ....... 700/28, 112, 117, 157; 404/84.05, 102, 404/111; 83/13, 39
See application file for complete search history.

(56) References Cited

U.S. PATENT DOCUMENTS

| | | |
|---|---|---|
| 2002/0061231 A1 | 5/2002 | Finzel et al. |
| 2006/0229851 A1 | 10/2006 | Cannon |
| 2012/0011974 A1* | 1/2012 | Georgi ................. B23D 45/003 83/14 |

* cited by examiner

Corresponding code symbol 4 "100010001002010010020"

CONTROL METHOD AND SYSTEM FOR A SAWING MACHINE

TECHNICAL FIELD

The present invention relates to a control method in a system. More specifically, the invention relates to a control method in a system according to claim 1. Furthermore, the invention also relates to a system thereof.

BACKGROUND OF THE INVENTION

The expansion of fibre optic networks for communication in residential areas is often hampered by the high cost of excavation and restoration of the road layer, such as asphalt or concrete. A typical residential connection may cost approximately EUR 3 000 plus VAT, and hence many homeowners are reluctant to make such an investment. This in turn means that the connection rate for houses is low when a residential area is built, which further increases the cost of connecting. The reason for this is that the cost for the backbone is more or less independent of the connection rate, and a low connection rate means that fewer houses will have to bear the total cost for the backbone.

An alternative, to provide house connections through green open spaces at the back of houses is in most cases not possible. Certainly, this would make the costs considerably lower as it may even be possible to plough down channelling tubing/ducts for fibre cables but this often involves crossing gardens in the homes of people not wanting to connect. There is also the question of flowerbeds, bushes and trees, which can be costly to replace/restore. Finally, it would probably be an enormous task to arrange permission from all the homeowners affected if this method should be employed.

The present application describes a new method for producing micro trenches and placing ducts/cables in the trenches also known as Micro Trenching Technique (MTT). In this respect, there is a need in the art for a control method for controlling entities in a system adapted for MTT.

SUMMARY OF THE INVENTION

An object of the present invention is to provide a control method which fully or in part solves the problems of prior art solutions. Another object is to provide a control method for controlling entities, such as sawing machines and GEO scanners, in a system adapted for trenching and/or placing ducts/cables (e.g. communication cables) and/or other activities in MTT. Yet another object of the present invention is to provide a system adapted for controlling system entities, such as sawing machines and GEO scanners.

According to an aspect of the invention the above mentioned objects are achieved by a control method in a system comprising a server unit having computer means, communication means and a first data base, said first data base including positioning data and a plurality of work orders, wherein said work orders are related to said positioning data; and a sawing machine having computer means and communication means, and being arranged for sawing trenches in an area; said method comprising the steps of:

transmitting, by said server unit, a first data flow A comprising a first work order to said sawing machine; and controlling said sawing machine by means of said first work order.

Embodiments of the method above are defined in the appended dependent method claims.

According to another aspect of the invention the above mentioned objects are also achieved with a system comprising a server unit having computer means, communication means and a first data base, said first data base including positioning data and a plurality of work orders, wherein said work orders are related to said positioning data; and a sawing machine having computer means and communication means, and being arranged for sawing trenches in an area; wherein said server unit is arranged for transmitting a first data flow A comprising a first work order to said sawing machine; and said sawing machine is arranged to be controlled by means of said first work order.

Embodiments of the system above are defined in the appended dependent system claims.

The present invention provides a method for controlling a sawing machine adapted for sawing trenches in a controlled and effective way. This means reduced cost and time saving, since the first type of work orders comprise information and control data for controlling the sawing machine so that the sawing machine performs its task in an effective and precise way. However, other entities, such as GEO scanners or other suitable devices, can be controlled with the present method.

Furthermore, according to preferred embodiments of the present method and system a complete solution for data collection (e.g. through geo scanning, inspections) and automatic real time documentation is provided by means of different data flows in the system. The real time documentation forms the basis for planning, projecting, maintenance and service. Planning, design and optimization based on collected documentation will result in work orders for execution and further data collection. Therefore, all parts of the system work together and contribute to the documentation which means that the information on which activities (defined by work orders) are based is always up to date. Hence, the work orders can be generated and/or modified on the latest relevant information available. This is not the case in prior art in which old or even obsolete information form the basis for decisions leading to costly solutions, accidents, and lost time.

Therefore, with the present invention, the activities (such as trenching, scanning, etc) can be performed efficiently; and materials and time-consumption to be calculated accurately. This in turn means that the cost of installation, service and maintenance can be minimized. Further, the system can self-initiate the delivery of materials depending on usage and future needs. The solution according to the invention also means that the system has full control over where and when the equipment is used and how much material that is used—information that can be used as a basis for effective and correct billing.

Other advantages and applications of the present invention will be apparent from the following detailed description of the invention.

BRIEF DESCRIPTION OF THE DRAWINGS

The appended drawings are intended to clarify and explain the present invention, in which.

DETAILED DESCRIPTION OF THE INVENTION

To achieve the above mentioned objects the present invention relates to a control method in a system adapted for trenching and/or placing ducts/cables (e.g. communication cables) into the trenches. The system according to the invention, in which the method is implemented, therefore comprises a server unit having computer means, communication means and a first data base which includes positioning data and a plurality of work orders. The system further comprises a sawing machine having computer means and communication means, and other necessary means so as to be arranged for sawing trenches in an area.

The present method in the system comprises the steps of: transmitting, by the server unit, a first data flow A comprising a first work order to the sawing machine; and controlling the sawing machine by means of the first work order. The first type of work orders comprise information and control data for controlling the sawing machine so that the sawing machine performs its task in an effective and precise way. The work order may e.g. instruct the sawing machine where (i.e. the position) to start and stop an activity: where to raise and lower the saw blade, where to stop for a side cut, when to change saw blade, etc. The activities can be executed manually, automatically or semi-automatically depending on the system entities and activities.

Figure 17:
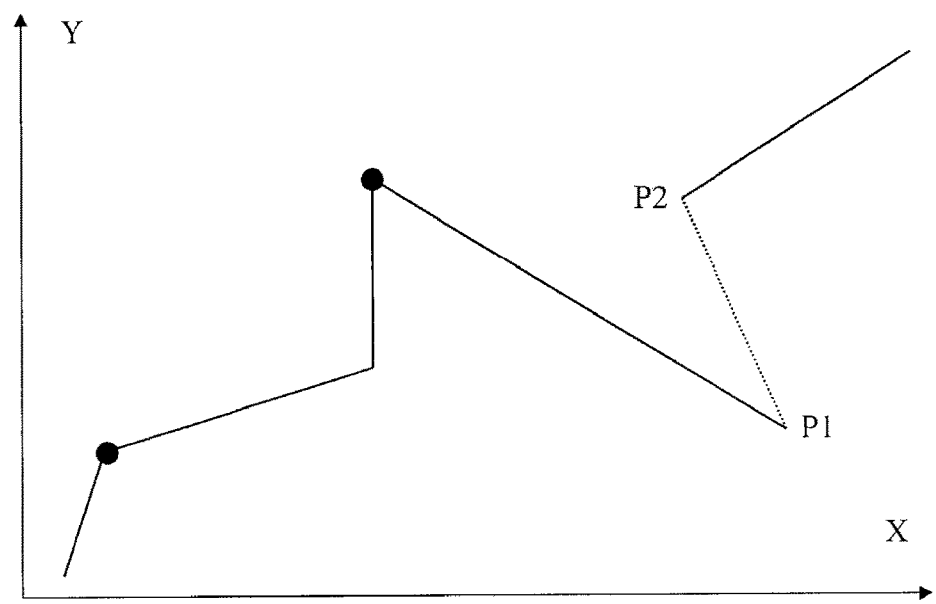
FIG. 17 illustrates a work order.

FIG. 17 illustrates an example of a work order in X-, Y-coordinates. The lines in the figure illustrates the positions in X-, Y-coordinates where trenches shall be sawn and the black spots indicate where the saw blade should be changed e.g. due to change of road layer from asphalt to concrete. Further, the dotted lines illustrate where the saw blade and the stabilizing device should be raised over ground since no trench shall be sawn in this area (which in this case relates to instructions in Z-coordinates). However, the dotted line marks which way the sawing machine shall move between positions P1 and P2. From position P2 the sawing machine continues producing micro trench.

The communication means are any suitable communication means so that wireless communication systems, such as GSM, UMTS, LTE, etc, can be used, e.g. over the Internet with well known protocols and techniques.

The work orders are related to the positioning data, e.g. the exact position to start and stop an activity, and the work order contains information to an entity/unit in the system which will perform a task. The work order contains information about what should be done, who should do it, when to do it and where it should be done. Each step to be performed may have extended information attached to it depending on the task to be performed.

The first database of the server unit is central to the present system and method. It contains all work orders regardless of type (first, second, third, fourth, etc), and all information is linked to a work order. The idea is that regardless of the type of work to be undertaken, (scanning, sawing, placing, installing, inspecting, etc.), there is a work order underlying an activity for the entities. The work order is supplemented by various types of information depending on the type of work. For example, for a GEO scanner it may contain the scanned images. For a sawing machine it is supplemented with information about where and how fibre is installed into the sawed trench. For inspections it store values that aggregate rotting in poles, pole tilt, etc. For installations above ground it stores information about what is installed on poles and what route it has from pole to pole, etc. The first database also includes a variety of tables with standard data that the user of the system can choose from to avoid entering data by hand which saves time. In addition, the database of collected positions (coordinates) that informs where the collecting devices, such as sawing machines and GEO scanners, have been. The first data base can further comprise spatial/map data for the mentioned area according to an embodiment of the invention. Spatial/map data can be seen as the information used to build the map image, e.g. lines and symbols and their positions on the map image.

Moreover, data/information collected by various government agencies may be imported to the first database, including: property data from Land Survey, population/demographic data, and road/rail data. In addition, data from the municipality, energy companies and other enterprise and organizations can be imported to the first data base to further facilitate planning and prospecting.

The controlling step may according to an embodiment of the invention involve: sawing, by the sawing machine, at least one trench in the area according to the first work order. Hence, the first data flow A preferably comprises position data related to the first work order. The position data contains information e.g. in X-, Y-, Z-coordinates where the sawing of the trench should be performed. Hence, it should be noted that the Z-coordinates to represent the depth of the trench to be sawn, X-coordinates represents longitude and Y-coordinates represents latitude.

According to another embodiment of the invention the sawing machine comprises a positioning receiver, such as a GPS receiver, for determining the position of the sawing machine. The present method therefore also comprises the steps of: transmitting, by said sawing machine, a second data flow B comprising positioning data for the sawing machine to the server unit, and updating the first data base with data contained in the second data flow B.

Figure 14:
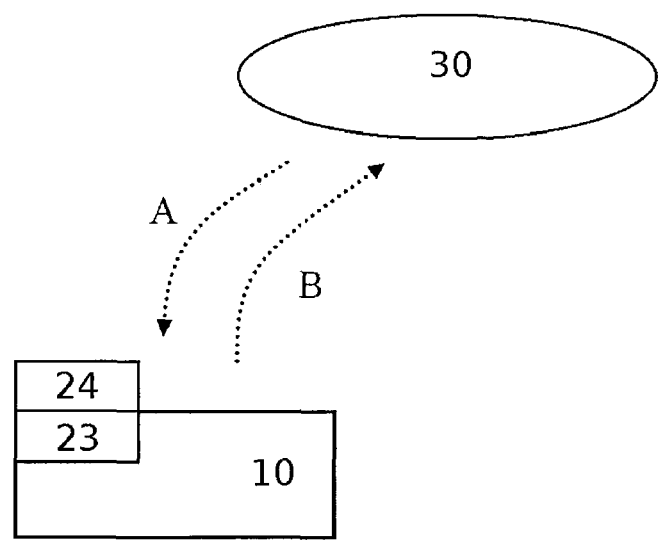
FIGS. 14-16 illustrates different data flows.

This embodiment is illustrated in FIG. 14. As seen in the figure a first data flow A is transmitted from the server unit to the sawing machine while a second data flow B is transferred in the opposite direction. The system can in this embodiment keep track of the exact position of the sawing machine. The positioning can also be used to lead staff to the right place and to control the entities in the system such as sawing machines. The position determination is also a safety feature in that it can accurately tell where a person like operator, installer or inspector is if an accident should occur.

All positioning data is sent to the server unit via suitable communication systems. When communication is not possible (e.g. when the communication is down or if there is lack of coverage) the positioning data and other relevant information can be stored in the computer means (or associated memory means) that is connected to the GPS receiver and transmitted when communicating is possible. Precise positioning in the X-, Y- and Z-coordinates is central to the automatic real-time documentation of the present invention. Geographic Information System (GIS/GIT) which is the software that computes the spatial data allows a traceability and precision with millimeter accuracy.

The second data flow B may also comprise receipt data corresponding to the first work order so that the system can keep track of how, and where the different work orders are performed. Hence, the receipt data relates to the positioning data of the sawing machine which means that for each receipt a position is recorded and stored.

The sawing machine in the system may comprises any suitable means, such as one or more engine means for powering the saw blade and the stabilizing device and/or for driving means (e.g. drive train and wheels), communication means for wireless communication with e.g. a remote server unit, processing/computer means, memory means, sensors, GPS means, vehicle means, display means for displaying information such as graphics, data base means. Information from these means (especially from the different sensors) is recorded and stored, and transmitted as operational data (for the sawing machine) to the server unit and/or to an office client in the second data flow.

Based on the information in the second data flow B, a new first work order may be generated or modified. This makes it possible for the system to use the automatic updated real time information so as to adapt the process of e.g. sawing trenches and placing ducts/cables. This means that the different activities in the method can be performed on accurate updated information which implies cost reduction and time saving.

As mentioned above, the sawing machine may also comprise a second data base which includes information from the first data base. The second data base can be continuously updated (by means of the communication means) with relevant information from the first data base, or be replicated to the first database of the server unit at start-up and when data needs to be renewed, the latter solution saving communication resources. This is to allow work to proceed even if communication is not possible between the client in the sawing machine and the server unit.

Further, the sawing machine may also have reading means for reading mechanical coding means arranged on the saw blade adapted for sawing trench. According to this embodiment the method further comprises the step of: checking whether the saw blade is a valid saw blade or not for use with the sawing machine. That is, the saw blade has a unique identity made up of the coding means, and if that identity is not valid an immobilizer makes it impossible to start the machine as long as a not valid saw blade is attached to the sawing machine.

According to yet another embodiment of the invention, the system further comprises a GEO scanner having communication means. The method according to this embodiment therefore further comprises the steps of: transmitting, by the server unit, a third data flow C comprising a second work order to the GEO scanner, scanning, by the GEO scanner, at least a part of the area according to the second work order, transmitting, by the GEO scanner, a fourth data flow D comprising scanning information about the area to the server unit, and updating the first data base with the fourth data flow D. Hence, according to this embodiment, the GEO scanner is controlled by means of the second work order.

The GEO scanner may preferably comprise a positioning receiver so that the fourth data flow D further comprises receipt data corresponding to the second work order and positioning data for the GEO scanner. The positioning data is related to the scanning information and receipt data. With the scanning and positioning information from the GEO scanner, the first data base is kept updated in real time with relevant geological data. Therefore, a first work order may be generated and/or modified based on the fourth data flow D. It should be noted that the first work order may be generated and/or modified based on the second and/or the fourth data flow so as to allow the system to use the latest correct information.

Figure 15:
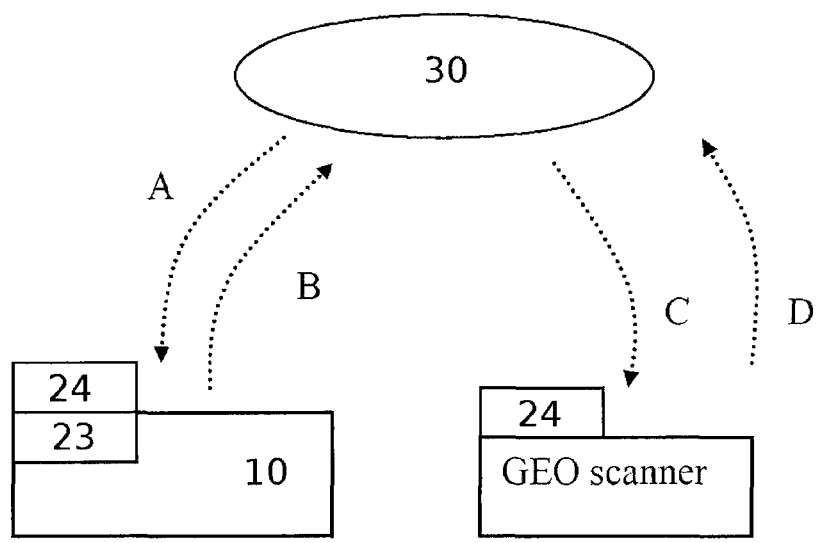

The described embodiment is illustrated in FIG. 15 in which the GEO scanner is a part of the process for investigating, detecting and documenting existing underground installations. A vehicle mounted ground penetrating radar detects signals that are sent into the ground at an angle in front, behind and just below the GEO scanner. The ground surface is e.g. covered with a width of about one meter. The depth depends on the purpose of the survey. For sawing for fibre installation 1 meter will often be enough, but other depths is possible. The signals from the GEO scanner are complemented by signals from the GPS positioning so that an exact location is stored for scanned images (the ratio of position/scanned image may be adjusted). The signals are filtered, interpreted and processed to give a comprehensible picture of what lies below the ground surface in which the trenches shall be sawn. There may be pipes, cables, paved over manhole covers, etc. The information also shows the state of the ground so that the right saw blade can be used by the sawing machine, e.g. concrete and asphalt needs different types of saw blades.

As with the sawing machine, the GEO scanner may also have a data base of its own, i.e. a third data base, including relevant information from the first data base. The third data base can be continuously updated (by means of communication means) with relevant information from the first data base or updated at start-up and when data have to be renewed.

The system according to the invention may also according to a preferred embodiment comprise an office client. The office client can be implemented in a personal computer (PC) having communication means, such as wired or wireless communication, so that it can interact and communicate with the server unit e.g. by means of a suitable web interface. The method according to this embodiment comprises the steps of: generating and/or modifying, by the office client, a first and/or a second work order. Transmitting, by the office client, a fifth data flow E comprising the generated and/or modified first and/or the second work order to the sawing machine and/or the GEO scanner via the server unit. However, the office client may also generate third and fourth (or any further) work orders to the installer and inspector, respectively.

The office client is connected to a master system, on the server unit that receives and processes data from the different clients, according to the invention for administrating trenching, placing, and other steps in the system. The master system may be used for machine control, fibre documentation in real time, logistics and optimization. The master system controls, monitors and records all activities and events related to the installation with the MTT method. Based on an optimized design different types of work orders are created. These work orders each contain information for different stages of the installation. They contain information about what to be done. For example, where each element will start, which saw blade to be used, how long and to what depth (Z-coordinate) it must be sawed, what is to be installed in the sawed trench, where side tracks are to be cut, etc. When the operator change the work order status as complete, by transmitting receipt data, information relating to the work orders is transferred from the system entity (e.g. sawing machine) to the server unit where it will be complement the existing information and documentation. In this way an automatic real time documentation system is built which will be updated continuously.

Figure 16:
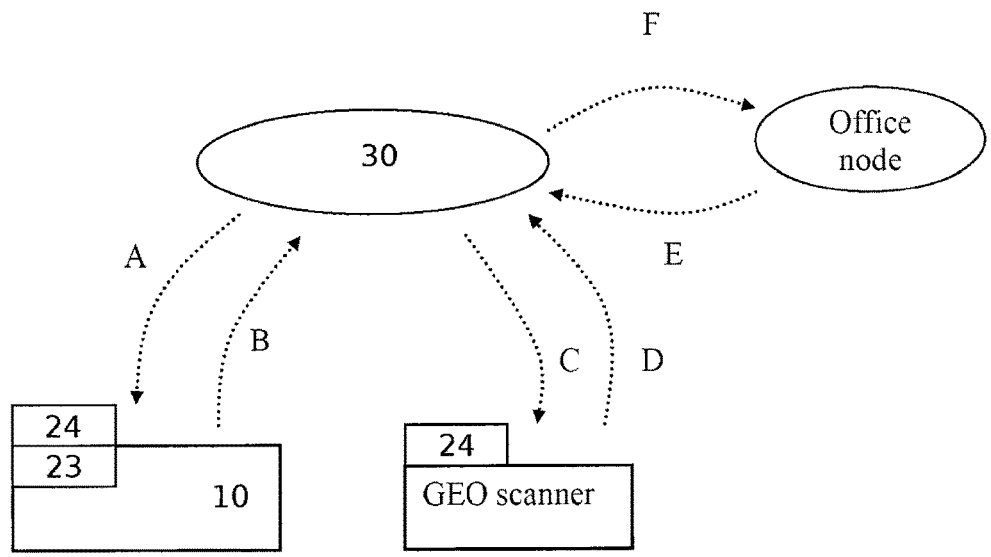

The above embodiment is illustrated in FIG. 16, in which also a sixth data flow F is illustrated. The present method may therefore also comprise the step of: transmitting, by the server unit, a sixth data flow F comprising the receipt data from the sawing machine and/or GEO scanner to the office client. However, the sixth data flow F can also comprise other information from the second B and fourth D data flows so as to update the office client with information.

Generally, the office client is used to create and modify: work orders, system parameters and spatial/map data. Work orders may be based on system parameters and the work orders may also contain system parameters, examples of system parameters are: different types of installation components, valid status values (e.g. "activity started", "activity finished"), available entities/equipment, personnel, etc. The office client may also be used to monitor the work of sawing machines, GEO scanners and other entities in the system, both visually on the map (displayed on a screen) and by the progress of work orders. The office client has no database of its own, so it stores all data in the first database on the server unit. Since there might be several office clients working with the same data it is important that the data is stored centrally at the server unit and not on different office clients. The data flow from the server unit to the office client contains receipt data and info related to the work orders, and position info from the other entities of the system. The data flow from the office system to the server contains work orders and spatial/map data.

To provide a deeper understanding of the present invention the following description of different embodiments illustrates different flows and activities of the present method.

1. GEO scanner:
    a. The office client creates second work orders for the GEO scanner that are sent to and stored in the first database. The second work orders say in principle: scan this section in this area;
    b. The GEO scanner downloads today's second work orders from the first database at start-up;
    c. The GEO scanner accepts the second work orders and performs them in sequence. Current position from the GPS is sent periodically to the server unit as well as receipt data;
    d. When a second work order is completed data from the scanning is transmitted/replicated to the first database;
    e. The scanning data from GEO scanner is filtered, interpreted and processed in by the server unit;
    f. Processed scanning data from GEO scanner is stored in usable format in the first database which therefore is updated in this respect.
2. Sawing machine:
    a. The office client creates first work orders for the sawing machine with the help of data from the GEO scanner and the first work orders are sent to and stored in the first data base;
    b. The sawing machine downloads the current first work orders from the first database at start-up;
    c. The attached saw blade ID is verified by the sawing machine;
    d. The sawing machine accepts first work orders and performs them in sequence;
    e. Current positions for the sawing machine from the GPS are sent periodically to the server unit;
    f. When a first work order is completed data and comments (e.g. in the form of receipt data) from the sawing machine is transmitted/replicated to the first database;
    g. If an alarm is triggered, information will be sent to the server unit; an alarm can for example notify that the saw blade is due to be replaced soon.
3. Inspector:
    a. Office client creates third work orders to an inspector using the previously documented information if available;
    b. The inspector downloads the current third work orders from the first database at start-up;
    c. The inspector accepts the work orders and performs them in sequence;
    d. Current position from the GPS is sent periodically to the server unit;
    e. If the object e.g. a pole or an installation cabinet to be inspected already exists the inspector checks and fills in the values of the electronic record;
    f. If the item is missing the inspector gives it identification with an RFID tag and the ID along with automatic positioning and other data is stored in the electronic record;
    g. When a work order is completed data and comments is replicated from the inspector's work order to the database;
    h. If an alarm is triggered information will be sent to the server unit.
4. Installer:
    a. Office client creates fourth work orders for an installer by using the previously documented information if available;
    b. The installer downloads today's work orders from the first database at start-up;
    c. The installer accepts the fourth work orders and performs them in sequence;
    d. Current position from the GPS is sent periodically to the server unit;
    e. The installer notes, if necessary, deviations from what is planned in the work order;
    f. If a new or existing object, e.g. a pole or an installation cabinet, lacks identification the installer gives it an identification with an RFID tag and the ID along with automatic positioning and other data is stored in the electronic record;
    g. When a work order is completed, data and comments are replicated from the installer's work order to the database;
    h. If an alarm is triggered information will be sent to the GIS server.

The inspector relates to how to organize and document airborne wire network status in real time. The inspector is equipped with a handheld computer (having communication means), GPS and RFID reading equipment. A work order for the inspection may relate to previously documented and identified equipment. But it can also be a case of inspecting and documenting equipment not previously documented. Depending on what is available already, the inspector will change or add information on different objects. It may for concern attaching an RFID label on a pole and inserting the identity, position, and a number of survey values in the system. Thus, the inspector may have instruments, for example for measuring the moisture content of wood poles, etc.

The inspector can directly communicate with the office client and notify of any errors that must be addressed. The office client can then immediately create another work order to a technician with an indication of what is to be addressed and exactly where the error is located. Since the inspector is in constant contact with the office client and always have a GPS position, the inspector can send an alarm and get help quickly if the inspector e.g. is victim of an accident. Alternatively, the system generates an alarm if certain parameters are met.

The installer relates to how to manage work orders and documentation in real-time for airborne installations. The installer gets a fourth work order that leads the installer to the correct position and provides information on what is to be installed and how. In connection with the installation of a fibre cable to existing poles the route is automatically exactly documented. All new items that are installed are also given an identity and an exact location in the documentation. All old items related to the installation that lacks identification are also given an identity and an exact location in the documentation. The system knows the exact material usage and can calculate the supply of additional material at the right time at right place.

If the actual conditions are inconsistent with the data used as basis for the planning the installer can directly communicate with the office client and notify of any corrections. The office client can then immediately create a modified or supplemented work order. Since the installer is in constant contact with the office client and always have a GPS position the installer can alert and get help quickly if the installer e.g. suffers an accident. Alternatively, the system generates an alarm if certain parameters are met, such as if installer's equipment has not moved for given time, or that the installer is not responding to messages.

The Data Base

This section gives an overview of some of the objects in the first data base.

Work Order Header:

Work order header is the element that represents the entire work order. It contains work order lines and the overall status for the work order. It also contains MachineId which is used to direct the work order to a specific machine. OperatorId is stored once the operator has started the work with the work order. One Work order header can have one or many Work order lines.

Work Order Line:

Work order line represents a specific activity for the work order. It contains information about what should be done and where. It also contains work order line items. One Work order line can have zero or many Work order line items. One Work order line can have zero or many Machine logs.

Work Order Line Item:

Work order line item is information about what material should be used for the work order line. It stores the actual quantity used for each item. It also contains work order line coordinates for each item and work order line log. One Work order line item can have zero or many Work order line coordinates. One Work order line item refers to one Item. One Work order line item refers to one Unit.

Work Order Line Coordinates:

Work order line coordinates stores the collected GPS coordinates for each item. This information will be used to create a perfect map/drawing of this installation.

Machine Line Log:

Machine line log collects information from the different sensors used by the system. A warning log record is created when a value reaches a specific value. An error log record is stored when the sensor reaches the critical value. The log file will also contain the blade id of the mounted blade.

Machine:

Machine contains an id and a description for each machine. It also contains information used for remote control of the machine.

Operator:

Operator contains id and name for the operator. It also contains contact information such as telephone number.

Unit:

Unit contains id and description for valid units (pieces, meters etc.).

Item:

Item contains id and description for valid items (ducts, connections etc.). One Item refers to one Unit The System The present invention furthermore relates to a system corresponding to the method according to the invention. The system comprises a server unit having computer means, communication means and a first data base. The first data base includes positioning data and a plurality of work orders, wherein the work orders are related to the positioning data. The system also comprises a sawing machine having computer means and communication means, and being arranged for sawing trenches in an area. Further, the server unit is arranged for transmitting a first data flow A comprising a first work order to the sawing machine, and the sawing machine is arranged to be controlled by means of the first work order.

As realized by the skilled person, the system may be modified, mutatis mutandis, according to different embodiments of the method, and vice versa.

Sawing Machine and Stabilizing Device

It has been realized by the inventors that the placement/installation of ducts/cables should preferably be made before the sides of the trench collapses and before stones (or debris) and in particular stones larger than the width of the trench are wedged into the sides of the trench and prevents the installation of the ducts/cables all the way down to the bottom of the trench. By achieving this time (and money) can be saved since the installation can be performed without unnecessary interruptions.

Therefore, a sawing machine is arranged for sawing micro trenches in an area with the present method. In this respect, the machine comprises a saw blade, preferable circular in shape, for sawing/cutting the micro trenches. The produced micro trenches are adapted for receiving ducts/cables which means that the micro trenches have the proper dimensions.

The machine also comprises a stabilizing device arranged for stabilizing the walls of the micro trench when placing ducts/cables, and for this purpose the stabilizing device is positioned immediately behind the saw blade in the micro trench, so that the walls are stabilized until the ducts/cables have bee placed/installed by means of guiding means which are also arranged on the stabilizing device.

For stabilizing the walls of the trenches, the stabilizing device comprises suitable elements such as proper side elements which are arranged to "hold up" the walls until the ducts/cables have been installed in the trenches. It is important that the stabilizing device is positioned immediately behind the saw blade so that the trenches sawn by the saw blade are stabilized directly after they are produced so that they do not collapse, or that debris or other dirt fall into the trenches before the ducts/cables have been placed. Therefore, a closest distance between the saw blade and the stabilizing device is larger than 0 mm but less than 10 mm according to an embodiment. The dimension of the stabilizing device is dependent on the size of the ducts/cables, the number of ducts to be placed at the same time, and the depth for placement in the trench. However, the width of the stabilizing device should be slightly less then the width of the sawing blade.

Furthermore, for achieving controlled and automatic placement of the ducts/cables the device has also guiding means which guides the ducts/cables into the trench in a controlled and ordered manner. The combination of stabilization and guiding has proved to reduce cost and time in an effective manner since the process of sawing and installing can be performed at the same time. The guides are arranged on the stabilizing device and hence makes it possible to place the ducts/cables into the trench while the trench is stabilized by the device. The ducts/cables can therefore be placed with high precision into the trench (e.g. on the correct height in the trench) since the trench is "clean" as long as the trench is stabilized by the device.

The stabilizing device may be made of any suitable strong material so that the trenches are stabilized. The material should preferably be rigid, tough, hard and yet flexible so as to withstand stress during operation. The mounting of the stabilizing device to the sawing machine should have an amount of flexibility to prevent damage if the stabilizing device is stuck in the trench. Steel or steel alloys are suitable since they can be given the right properties by alloying with different metals such as platinum and manganese. There is limited space in the trench so the walls of the stabilizing device have to be thin as possible so as to be able to accommodate the passing the ducts/cables but still have the properties mentioned above. Steel alloys in the hardness of about 400-700 Brinell have proved suitable for these applications. It has also been realised that the stabilizing device can be made of moulded carbon fibre. Different parts of the stabilizing device can be cast separately and assembled into a stabilizing device assembly.

According to an embodiment, the device has an inlet and an outlet for ducts/cables, the inlet and outlet being connected to the guiding means. Preferably, the guiding means are channels through which the ducts/cables are guided through the stabilizing device. When in operation, the inlet is preferably above ground and vertically or close to vertically arranged while the outlet is below ground in the trench and horizontally or close to horizontally arranged in order to minimize wear and tear on the ducts/cables. Therefore, a minimum distance between the outlet and the saw blade (at ground lever) is slightly longer than the recommended minimum bending radius for the ducts/cables to be installed. This normally translates to somewhere between 100 to 500 mm measured at ground level, but other distances are possible. Further, the inlet, outlet and guiding means may together be removably attached on the stabilizing device e.g. in the form of a removable cassette. By having a removable cassette for the guiding means, the installation time shortens in some cases as the time consuming task of inserting many ducts/cables into their respective channels may be avoided It has also been realized by the inventors that an operating depth for the stabilizing device in the micro trench should be up to 50 mm less than an operating depth for the saw blade according to an embodiment. This difference in depth between the saw blade and the stabilizing device, when in operation, decides how quickly the ground level may change (i.e. goes down). The saw blade must have sawed the trench deep enough so that the stabilizing device never touches the bottom of the trench in order to avoid the possibility of the stabilizing device sticking to the ground. This avoids unnecessary forces on the stabilizing device and possible breakage. This may happen when the ground level suddenly becomes lower.

Moreover, according to yet another embodiment, the stabilizing device and the saw blade are arranged to be elevated and lowered independently of each other. This is advantages when for example the saw blade has to be changed due to wear or when another type of saw blade is needed (e.g. one type for asphalt and another type for concrete). Further, the stabilizing device may have to be replaced which may easily be performed if the two parts can be lowered and elevated independently of each other. Also, during shorter interruptions in the sawing operation the sawing blade is elevated, but the stabilizing device must remain in the ground, since the need for stabilization of the trench still exists. However, the stabilizing device and the saw blade may further be arranged to together be elevated and lowered, e.g. when underground infrastructure is encountered both parts can be elevated so as to avoid damage.

The stabilizing device is preferably mounted separately on the sawing machine by means of a number of movable axes for elevation and lowering. The movable axes may be powered by a dedicated engine for this specific purpose. Further, the sawing machine may have on its left and right sides (in the sawing direction) attachments means and driving means for both the stabilizing device and the saw blade. Thereby, any of the left or right sides of the sawing machine can be used for sawing and placing ducts/cables which may be necessary due to hindering infrastructure, traffic situation in the area, etc.

Figure 9:
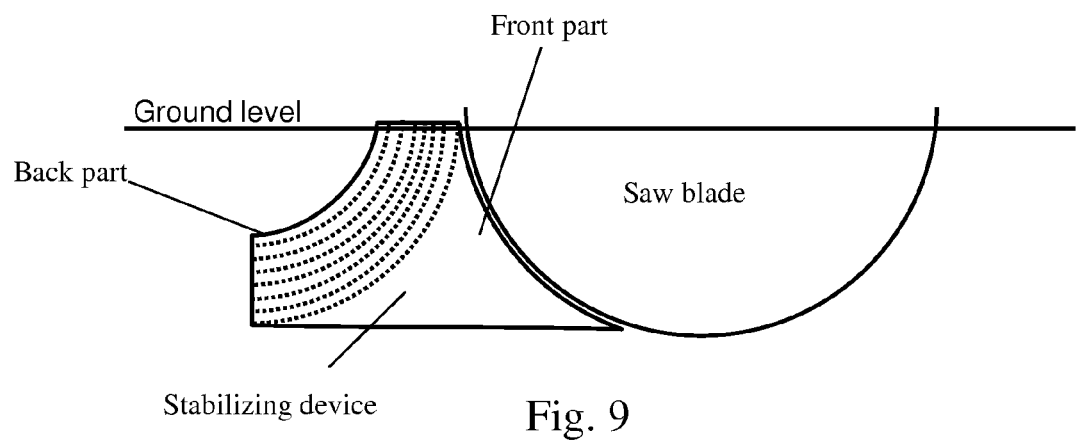
FIG. 9 shows the sawing machine where the stabilizing device is adapted for placing a plurality of ducts/cables at the same time while maintaining the order of the ducts/cables in the micro trench.

FIG. 9 shows an embodiment of a machine. The stabilizing device has a front part and a back part, wherein the front part is located immediately behind the saw blade. It can also be seen that the stabilizing device has a section at the front part that has a shape that is complementary to the shape of the saw blade, which in this particular case is circular. Thus, in case the section at the front part has a concave circular shape with the same radius, or close to the same radius, as the saw blade and is placed as close as possible and less than 10 mm away from the saw blade. The reason for this is that the underground part of the stabilizing device must be arranged so close to the saw blade such that it is virtually impossible for dirt, stones and other debris to fall to the bottom of the trench, or wedge between the sides of the trench. The guiding means in this embodiment are guiding channels inside the stabilizing device. The channels are illustrated with dotted lines in the figures.

Figure 11:
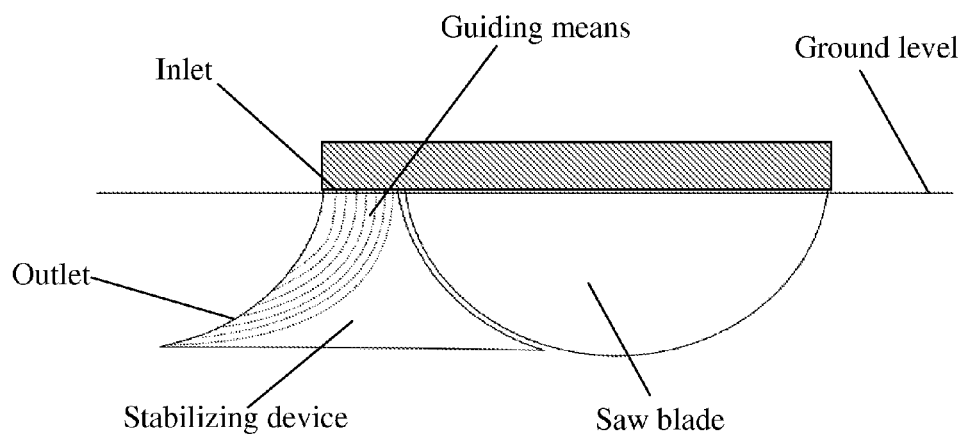
FIGS. 11-13 shows further embodiments of the stabilizing device (the channels are only illustrated in FIGS. 11-13 and should therefore not be seen as true representations)
Figure 12:
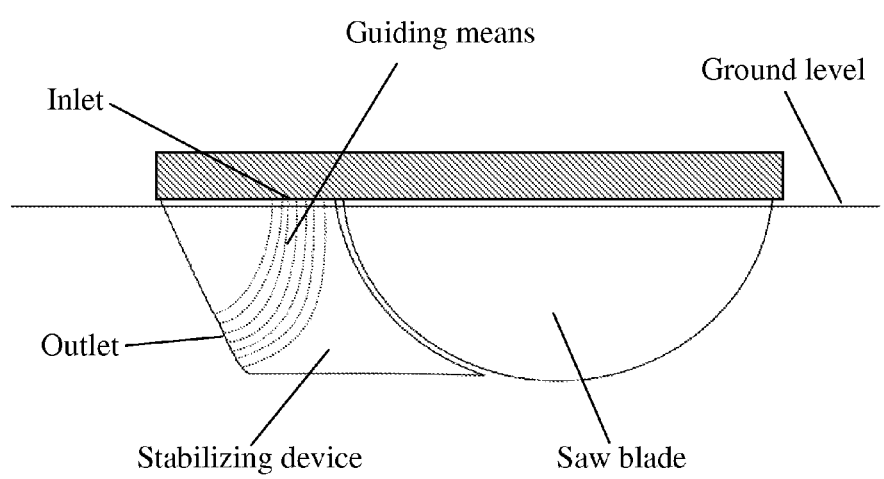
Figure 13:
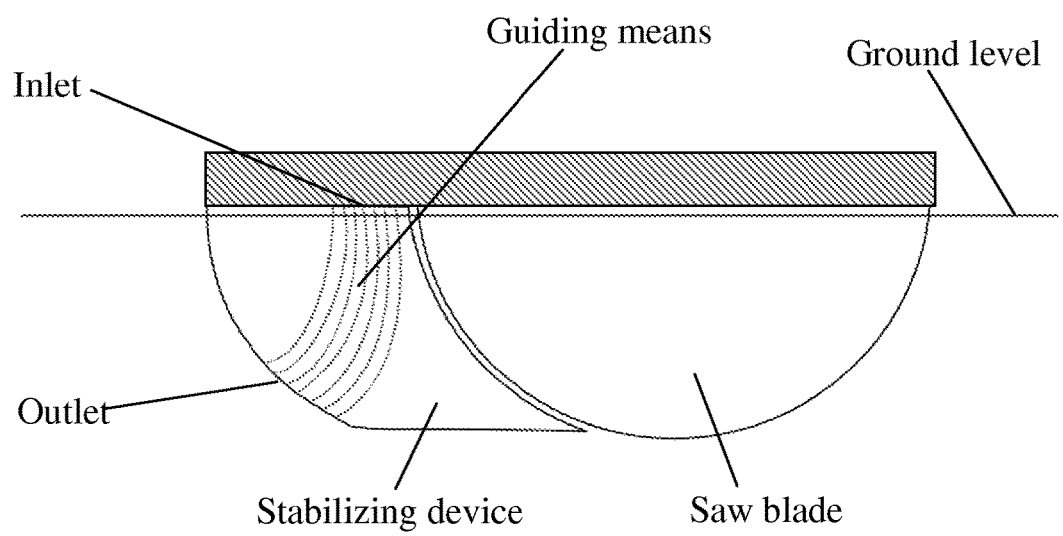

Further, the back part of the stabilizing device where the outlet is arranged may have different preferred shapes. One shape is substantially parallel to the complementary shape of the front section described above. Another shape is substantially opposite to the complementary shape, and a third embodiment defines a shape for the back part which is substantially diagonal from the base to the top of the back part in the backwards direction. These embodiments are shown in FIGS. 11-13. It is further to be noted that the inlet, outlet and channels are arranged on the back part of the stabilizing device in this embodiment. The stabilizing device may also be axe shaped in cross section at the front part in the forward direction.

Preferably, as mentioned above the stabilizing device has a maximum width in cross section that is equal to or slightly less than a width for the saw blade. The stabilizing device must be wide enough to have room for the ducts/cables to be installed, but small enough so that it can be drawn along the sawed trench.

Another important aspect is that with the use of guiding means an order of a plurality of ducts/cables is preserved when placed in the micro trench. This is very important when more than one duct is placed at the same time. In one installation scenario, the duct/cable for a certain house is cut at a certain distance after the house. It is important that this duct/cable is one of the ducts/cables on top of the pile of ducts/cables in the trench, so that it can be easily found. The duct/cable must be cut before the stabilizing device. Therefore it is important to know which one of all ducts/cables that enters the stabilizing device will come out on top in the trench. Moreover as the colour of the duct/cable for a certain house is in many cases decided before the sawing begins, the order of the ducts/cables must be arranged so that the duct/cable with correct colour comes out on top, cut to the correct length, in the trench when that particular house is passed.

Figure 6:
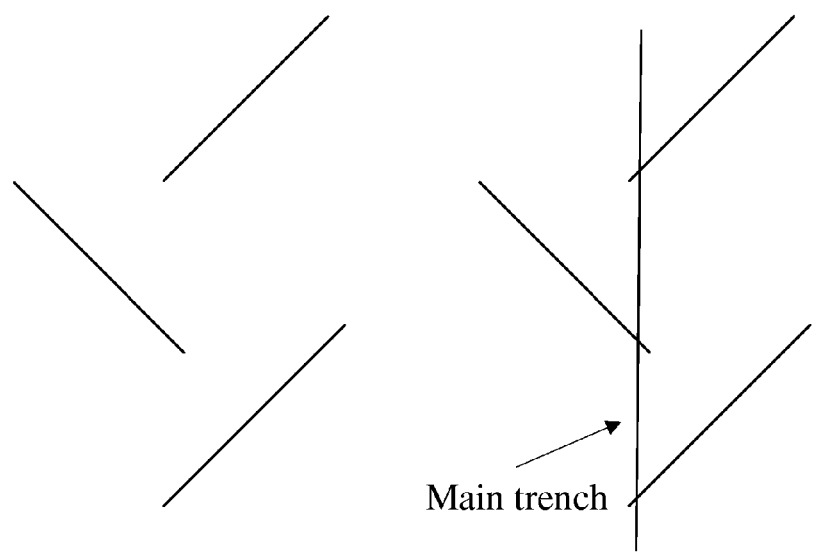
FIG. 6 shows how to saw branches to individual homes from a main micro trench.
Figure 7:
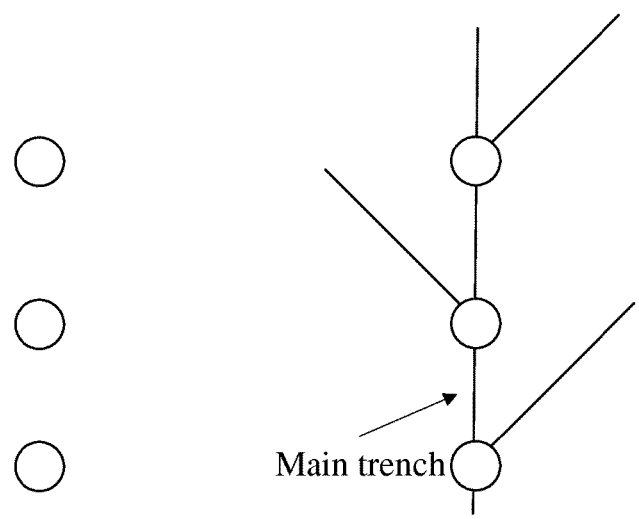
FIG. 7 shows branching to individual homes if boring is used instead of sawing.

A method which allows the placement of a plurality of ducts/cables at the same time has a very high commercial value since the process of placement can be performed much faster than what has previously been know in the art. Therefore, according to this embodiment, the stabilizing device has a plurality of guiding means each guiding one or a few ducts/cables into the trench. For example, the device may comprise a plurality of channels so arranged that a know order is preserved, which means that an order of the ducts/cables out of the stabilizing device is known form the order of ducts/cables into the stabilizing device, hence the order into and out of the stabilizing device is related and known. This can e.g. be achieved by a one-to-one mapping between the inlet and the outlet of the device. The order of the ducts/cables should be arranged in such a way that one of the ducts/cables on top of the pile of ducts/cables in the trench is always the one to be routed to the next location. Therefore, a downmost duct/cable entering the inlet will be an uppermost duct/cable out from the outlet, and the uppermost duct/cable entering the inlet will be a downmost duct/cable out from the outlet. The branching micro trenches may be sawn before the main trench as shown in FIGS. 6 and 7 or the branching micro trenches may be sawn after the main trench is sawn. The particular order in which the trenches are sawn may be decided to achieve the best flow during the installation. Each branching micro trench goes to a final location for one of the ducts/cables from the main micro trench. When the main trench is sawn and the ducts/cables are installed, the uppermost duct/cable is cut (before it enters the stabilizing device) at a certain distance beyond the location of the respective branching trench, so that that duct/cable can be lifted and routed to the final location for that duct/cable, see FIG. 10. If the cut is made correctly the length of the duct/cable will be sufficient so that the duct/cable is long enough to reach the final location without splicing. In this way the ducts/cables are one by one routed to each passed location through the branches.

Depending on the width of the trench and the size of the ducts/communication cables there may be one or more ducts/communication cables side by side as the uppermost ducts/communication cables in the main trench. It is important that the duct/cable next to be routed to its final location is always one of the ones on top. To achieve this is, when cutting the main trench and placing a number of ducts/cables, to cut one of the uppermost ducts/communication cables, the one designated to this specific location, at a certain distance after passing the corresponding branching trench, so that the cut duct/cable can be lifted and routed through that branching micro trench to its final location. The duct/cable should be cut at a certain minimum distance after passing the corresponding branching trench, so that, when lifted from the main trench and routed towards its final location, the length is sufficient to reach the final location without splicing.

If the stabilizing device (formerly also known as "plough") is designed with individual channels for the ducts/cables or with individual channels, each with room for a few ducts/cables, it is easy to know which duct/cable will be on top in the trench and thereby which duct/cable should be cut before the stabilizing device. Example of such stabilizing device is shown in FIG. 9. The stabilizing device in this embodiment has a duct/cable inlet and a duct/cable outlet which is connected to each other by means of a plurality of channels as guiding means (illustrated with dotted lines) for the ducts/cables. The underground outlet of the stabilizing device may in an embodiment comprise a "matrix" (or vector) part so arranged that the channels are arranged in a matrix with n row and m columns, thereby in a controlled way horizontally and/or vertically separating the ducts/cables when placing them in the micro trench.

So in summary, one after the other, cutting one of the uppermost ducts/communication cables, which one is designated to a certain location, at a certain minimum distance after each branch and thereafter lifting this duct/communication cable from the main trench and routing it to its final location through the branch.

The machine may further comprise at least one drum arranged for holding the ducts/communication cables before placing them into the micro trench via the stabilizing device. In this way easy access to the ducts/cables is achieved.

Further, the machine may also comprises other suitable means, such as: one or more engine means for powering the saw blade and the stabilizing device and/or for driving means (e.g. drive train and wheels), communication means for wireless communication with e.g. a remote server unit, processing/computer means, memory means, sensors, GPS means, vehicle means, display means for displaying information such as graphics, data base means, reading means for reading mechanical coding means on the saw blade, immobilizer, etc.

Regarding the driving of the saw blade and/or the stabilizing device this can e.g. be performed by means of direct mechanical driving, hydraulic driving and electric driving. The mechanical driving gives the highest power transmission ration while the electrical driving gives the lowest, so the former is preferred if high power is needed which often is the case.

Sawing Machine and Saw Blade

As already mentioned the sawing machine 10 is of the type arranged for sawing/cutting micro trenches by means of the saw blade 1. The saw blade may comprise mechanical coding means 2 selected from the group consisting of holes, depressions and protrusions which are arranged on the saw blade 1. The holes, depressions and protrusions are coding elements for forming at least one code symbol 4 representing a unique identity ID for the saw blade 1.

By giving the saw blade a unique identity the following advantages can be added to the micro trenching process (MTT) described in this disclosure, such as:

- Full traceability of the saw blade from production to destruction
- Safer handling of the saw process by using the right blade
- Optimization of the choice of saw blades relative to the material in the ground for extending the lifetime of the saw blade
- Calculation of the saw blade optimum turning radius in relation to the material in the ground for extending the life of the saw blade
- When the material in the ground changes, the program automatically calculates the cost of replacing saw blades (e.g. time multiplied by the hourly rate) this is compared to the possibly increased wear and life expectancy of the saw blade
- Quality assurance and process monitoring
- Management of return system for saw blades
- Automatic documentation of events and errors
- Information from the sawing machine's data systems can be linked to the saw blade
- Immobilizer to prevent that invalid/incorrect saw blades to be used
- The collected history can be used directly in product development
- On-line billing based on wear and tear may be added when all the data about what and how the saw blade has been used can be obtained in real time or afterward
- Specific properties for an individual saw blade (such as coating, tolerances and guarantee conditions) can be communicated to the machine's IT systems to prevent erroneous and dangerous use
- The position of the saw blade in X-, Y- and Z-coordinates are documented in real time, this make it an exact spatial and tabular description of the saw blades whole life The mechanical coding means in the form of holes, depressions and protrusions may have different depth or height or spatial location or size according to an embodiment. Mentioned differences are used for distinguishing different coding elements from each other, i.e. giving the holes, depressions and protrusions coding element meaning depending on mentioned depth, height, size and spatial location. For example, two depressions having different depth mean that they represent two different coding elements. Hence, an almost infinite large number of characters may be constructed. Thereby, by combining the different elements a large number of coding symbols may be formed.

Figure 19:
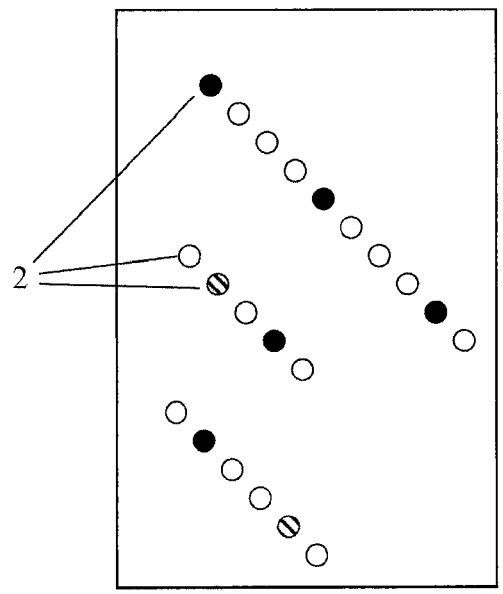
FIG. 19 illustrates mechanical coding elements.

FIG. 19 shows an example of different mechanical coding elements which together form at least one coding symbol representing a unique identity ID. The black circles represent holes, the white circles depressions and the dashed circles protrusions, respectively in FIG. 19.

The saw blade may further comprises coding elements in the form of electro magnetic coding means 3 which may be combined with the mechanical coding elements for forming code symbols representing a unique identity ID for the saw blade. This embodiment is a safeguard against the harsh environmental condition in which the saw blades are used, i.e. the unique identity ID may still be read even though dust and other debris from the micro trenching process covers the saw blade. The mechanical and electro magnetic coding means may also be more or less replicas of each other thereby providing redundancy to the code reducing erroneous reading of the identity ID. Another alternative is to use Forward Error Correction (FEC) which is often used in tele- and radio-communications.

Figure 20:
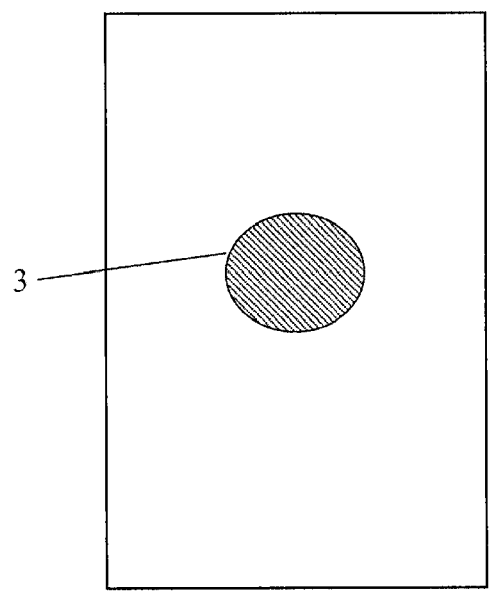
FIG. 20 illustrates electro mechanical coding elements.

The electro magnetic coding means 3 are preferably comprised in a RFID device, e.g. in the form of a chip or an electric circuit mounted on the saw blade. FIG. 20 illustrates such as a RFID device comprising electro magnetic coding means 3.

It should however be realised that the coding elements may also comprise further information besides the unique identity. For example, manufacturer, production batch, type (so that correct type of saw blade is mounted for a specific work), etc.

The code symbol 4 (as an ID) may further function as an immobilizer for the sawing machine 10 to which the saw blade is attached. For example, the on-board computer may be programmed to prevent the sawing machine from starting if the saw blade does not have a correct/valid identity.

As mentioned above, the saw blade is arranged to be used in a sawing machine for sawing/cutting micro trenches. Thus, the saw blade comprises first attachment means A1 for attaching said saw blade 1 to the sawing machine 10. Hence, the sawing machine comprises second attachment means A2 complementary to the first attachments means A1 for attaching the saw blade 1 to the sawing machine 10 when in use. Typically, an attachment axis (in this case second attachment means A2) arranged on the sawing machine is inserted into a centre hole (in this case first attachment means A1) arranged on the saw blade, thereafter a chuck is used to secure the saw blade to the sawing machine.

It is advantageous the mechanical coding means 2 and the electro magnetic coding means 3 are arranged adjacent to the first attachment means A1 on the saw blade 1. The area on the saw blade adjacent to the first attachment means A1 is not used for sawing which means that this particular area is protected from mechanical wear compared to the circumferential part of the saw blade and therefore suitable for the placement of the coding means. Therefore, according to this embodiment, the reading means on the sawing machine should in a corresponding manner be arranged adjacent to the second attachment means A2.

Figure 18A:
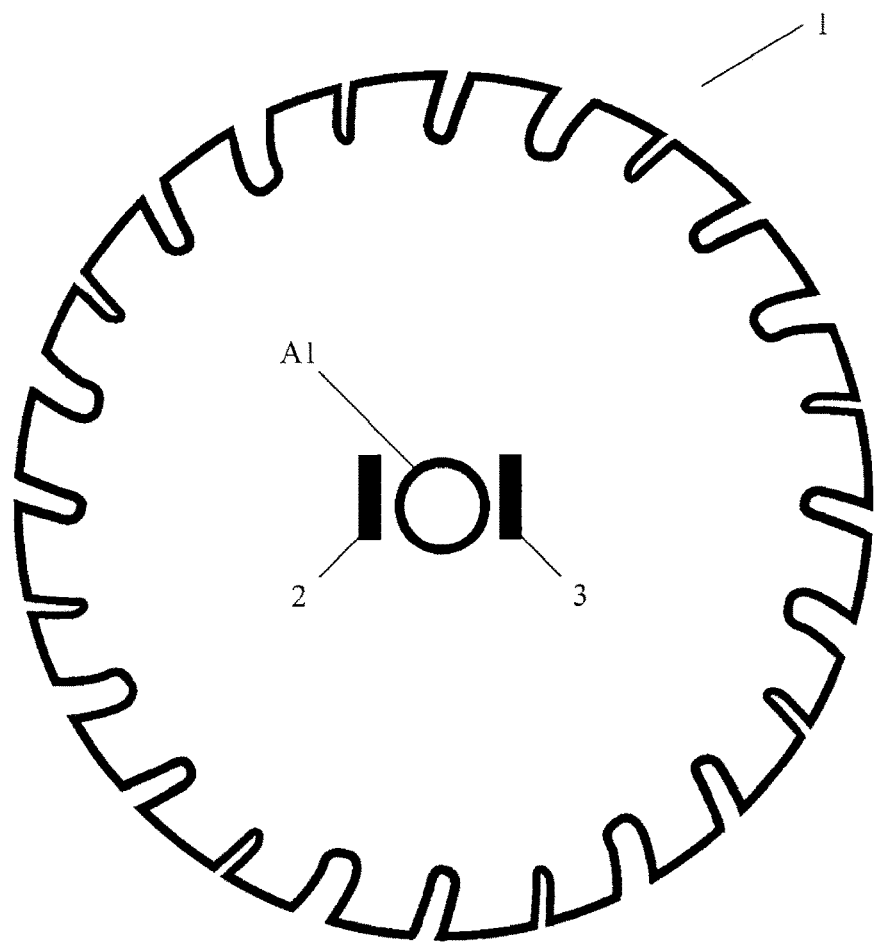
FIG. 18a shows a saw blade.

FIG. 18a shows an embodiment of a saw blade. This particular embodiment comprises both mechanical and electro magnetic coding elements. This makes it possible to identify the saw blade even if one of the methods (mechanical or electro magnetic) fails.

According to yet another embodiment the saw blade is coated/covered with diamonds (not shown in FIG. 1), and is available in several different configurations dependent on ground and surface material and desired cut depth and width. Currently the ratio width is maximized to 40 mm and the depth of 600 mm. For fibre, 25 mm wide and 400 mm deep is used in the normal case. Hence, the saw blade for sawing micro trenches is arranged for depths between 10 to 600 mm and widths between 5 to 25 mm according to a preferred embodiment.

According to another embodiment the rotation of the saw blade is counter clockwise so that material is transported up in front of the saw and can be collected in a container that is mounted in front of the saw blade. The counter clockwise rotation of the saw blade also means that less debris is left in the micro trench.

The saw blade may further be cooled with water, and may be monitored by sensors that give indications of heat (sensor), wobbling (gyro), speed (tachometer), saw pressure (sensor) and wear (sensor). The wear of the saw blade can be determined by analysing wave signals from the sound of the saw blade in operation.

Software that indicates and addresses emerging sensor deflection is installed in the machines on board computer (i.e. computer means). Heat and wobbling are the most common reasons for saw blade damage. The saw blade is stopped and lifted automatically at given parameters in order to avoid a breakdown.

Further, the saw blade need be applied against the ground absolutely vertically during the process to prevent wobbling and uneven wear. A gyro monitor so that this happens, the software in the on board computer verify that the application is kept within given parameters, and terminates automatically upon failure.

Saw blade speed for best results should be smooth. Deviations from given parameters are handled by the software in the on board computer.

Saw pressure is related to the solid nature of the ground material and the speed at which the machine is driven forward. Sensors and control systems monitor the relationship between the saw blade pressure and speed of the driving wheels and the software automatically control relations between these two.

With unique identity ID labelling, all the above information and any deviation singled out geographically in X-, Y-, and Z-coordinates can be linked to each separate saw blade.

Methods for Labelling and Reading/Scanning Coding Elements

The labelling of saw blades can be done with a number of different methods depending on the surrounding environment, and how the production line of the saw blades is designed. In order to ensure a lifetime labelling which do not require major changes in the production line the following methods for labelling and scanning may be used:

Labelling Coding Elements

Saw blades may be labelled mechanically by depressing techniques, punching or laser firing, with a number of subscript dots of different depth, height and size, and in different spatial relationships to each other. The combination of deep, height, size and spatial distribution gives an infinite number of variables for forming code symbols. The labelling may preferably be carried out adjacent to the attachment of the blade, as part of the production of the saw blade. Each saw blade can with this technique be given a unique identity.

Labelling is e.g. done with a tool that with a rotating punch generates a unique point formation on each saw blade. The punch tool is associated with a software that post all the individual saw blades and adds these attributes in written form on a packing slip that are applied to the saw blade on a sticker. Saw blade now has a unique identity that is passed to a database that is accessible from the saw machines on board computer via e.g. a Web interface.

Reading/Scanning Coding Elements and Identifying Code Symbol

The reading of a unique saw blade identity ID can be done with a number of different suitable methods, such as:
1) Optically, using a laser scanner that is applied close to the mounting of the saw blade on the sawing machine;
2) Mechanical machine attachment that uses a number of metal pins read the depth and position of e.g. punched points which means that the saw blade serves as a key in a "lock"; and
3) Electromagnetic reading using RFID technology if electromagnetic coding means are arranged on the saw blade.

Methods 2 and 3 above in combination provide a very secure reading in a tough environment.

Formation (of e.g. sequences and positions of punched holes in the saw blade) that makes up an unique identity ID can be translated into characters that are read via the saw blades attachment to the machine using electromagnetic reading means. Point data can be read by a number of spring attached metal balls that automatically senses point data on the blade. The balls positions varies depending on the hole size and leaves imprint on a sensor plate. This translates information into digital format that is read by the sawing machine's IT system. The combination of the above method enhances safety and reliability of decoding. Systems can however function individually but allows no conflicts between each other.

The sawing machine reads the saw blades unique identity ID which in this case acts as a key. Lock features can be added to the key depending on security and guarantee reasons. The sawing machine can thus be provided with immobilizer so that it can not start if the unique identity ID is incorrect. Information about a non-authorized saw blade usage may be delivered (e.g. by means of wireless communication) to the machine's owners, drivers and manufacturers if desired.

The information about the saw blade and its history is collected in the sawing machine's on board computer. The saw blade's identity ID is linked to other information that is generated by the sawing machine's various sensors which describe all deviations and conditions associated with use of the saw blade. This can for example be:
Runtime
Machine speed
Rotation speed
Wobbling
Temperatures
Ground conditions
Turn radius
Wear
Blade pressure
Etc.

All the above information is of importance for an optimal lifespan of the saw blade, and that the operation is carried out safely. Further, guarantees and other responsibilities will be easier to ensure.

After the saw blade has been used the saw blades remaining duration can be calculated and a billing system based on real information is possible to implement. The saw blade may be returned to the producer. A deposit system based on real factors is created. A saw blade that has been properly used can be much easier to reuse and will be commanding a significantly higher value than a wrongly used saw blade.

Sawing Machine

Figure 18B:
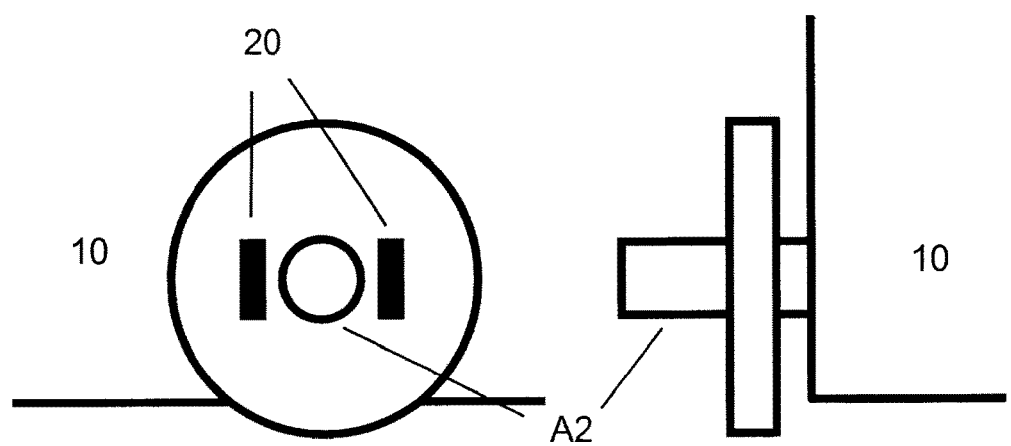
FIG. 18b shows the attachment of the saw blade to the sawing machine with means for reading coding elements on the saw blade.

As shown in FIG. 18b, the sawing machine 10 may comprise second attachment means A2 complementary to the first attachments means A1 for attaching the saw blade 1 securely to the sawing machine 10, when in use. Further, the sawing machine 10 comprises reading means 20 for reading the coding elements arranged on the saw blade so as to identify the unique identity of the saw blade. Preferably, the reading means 20 are one or more in the group comprising: optical reading means, electro magnetic reading means, and mechanical reading means.

Furthermore, according to another embodiment of the invention, the present sawing machine 10 is arranged to not start if the unique identity ID is incorrect, e.g. by including an immobilizer. If the identity does not match, the sawing machine will not start and thereby operation is impossible.

The sawing machine may also include one or more sensors 22 in the group comprising: heat sensors, gyro, speed sensors, pressure sensors, engine sensors and wear sensors; and computer means 23 in communication with the reading means and sensors. The computer means 23 is arranged for decoding and identifying the unique identity ID. The computer means 23 may also be arranged for monitoring the sensors 22 and controlling the operation of the sawing machine 10.

According to another embodiment, the sawing machine further comprises high precision GPS 24 in communication with the computer means 23 for documenting the use of the at least one saw blade 1 in X-, Y- and Z-coordinates as cartographic position data. Mentioned data may also be transmitted to a server unit by means of a second data flow, which means that the sawing machine may also comprises wireless communication means for communication with external communication device over one or more wireless communication systems, such as e.g. GSM, UMTS, WiFi, E-UTRA, etc.

System: Sawing Machine and Saw Blade

Furthermore, a system is considered comprising at least one saw blade 1 and at least one sawing machine 10 according to the present invention. Preferably, the system further comprises a server unit 30 arranged for collecting and storing location and operation data from the high precision GPS 24, the sensors 22, and the computer means 23.

The server unit 30 may further be arranged for analysing the location and operation data and transmitting control data by means of first work orders in a first data flow to said computer means 23 after having analysed the above mentioned data. This control data can for example tell the operator of the sawing machine to change to another type of saw blade, or to reduce driving speed depending on parameters in the GIS server analysis program. The GIS server analysis program parameters contain factors, such as security factors, time factors, cost factors, etc.

Furthermore, mentioned analysed location and operation data may be used by a back office client master system for managing work orders, planning purchase and service, and for statistical analyses and documentation of the micro trenching process. Therefore, the server unit 30 may also be arranged for acting as a hub between the sawing machine and an office client. The information stored in a first data base of the server unit is available and can be integrated to the business system's different functions. Such as creating purchase orders and invoices.

Micro Trenching Technique (MTT)

Figure 1:
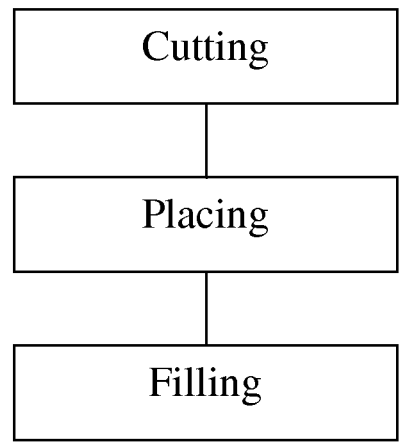
FIG. 1 shows a flow chart of MTT.

With reference to FIG. 1, which shows a flow chart of the MTT method for placing at least one duct/communication cable below a road surface in the area comprise the steps of:

cutting a micro trench in the area through the first layer L1 into the second layer L2;

placing at least one duct/communication cable in the micro trench so that the at least one duct/communication cable is placed below the first layer L4; and filling the micro trench so as to restore the road surface.

Figure 3A:
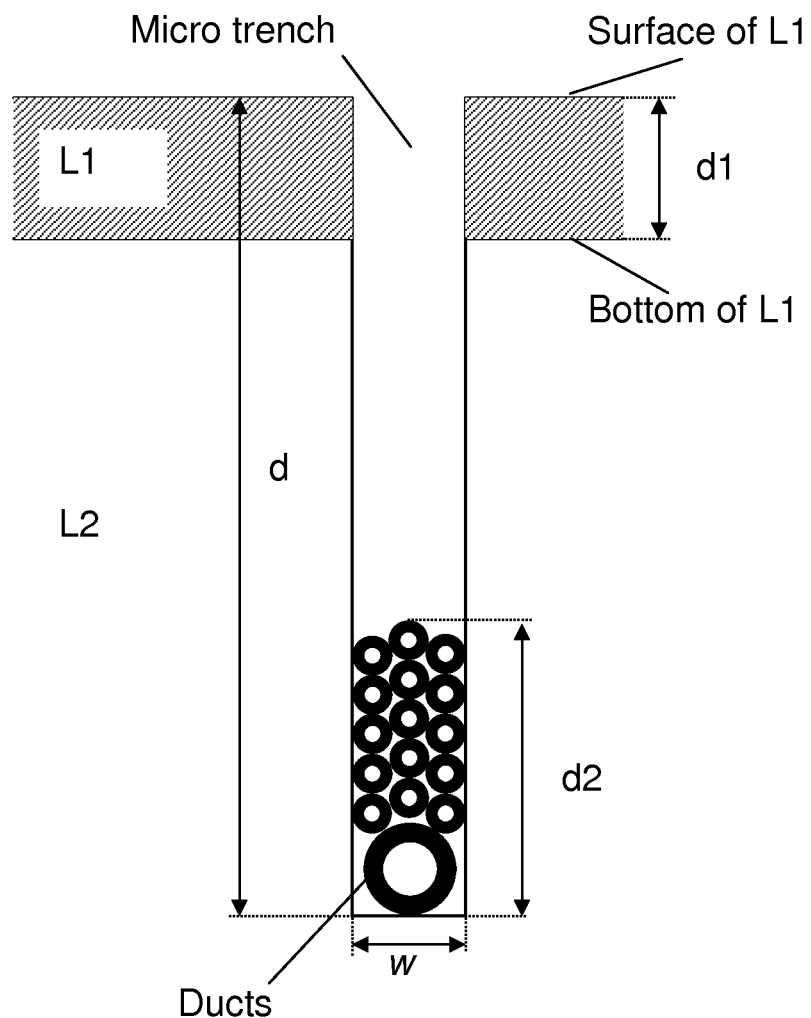
FIGS. 3a and 3b schematically shows a cross section of a roadway area with a micro trench.
Figure 3B:
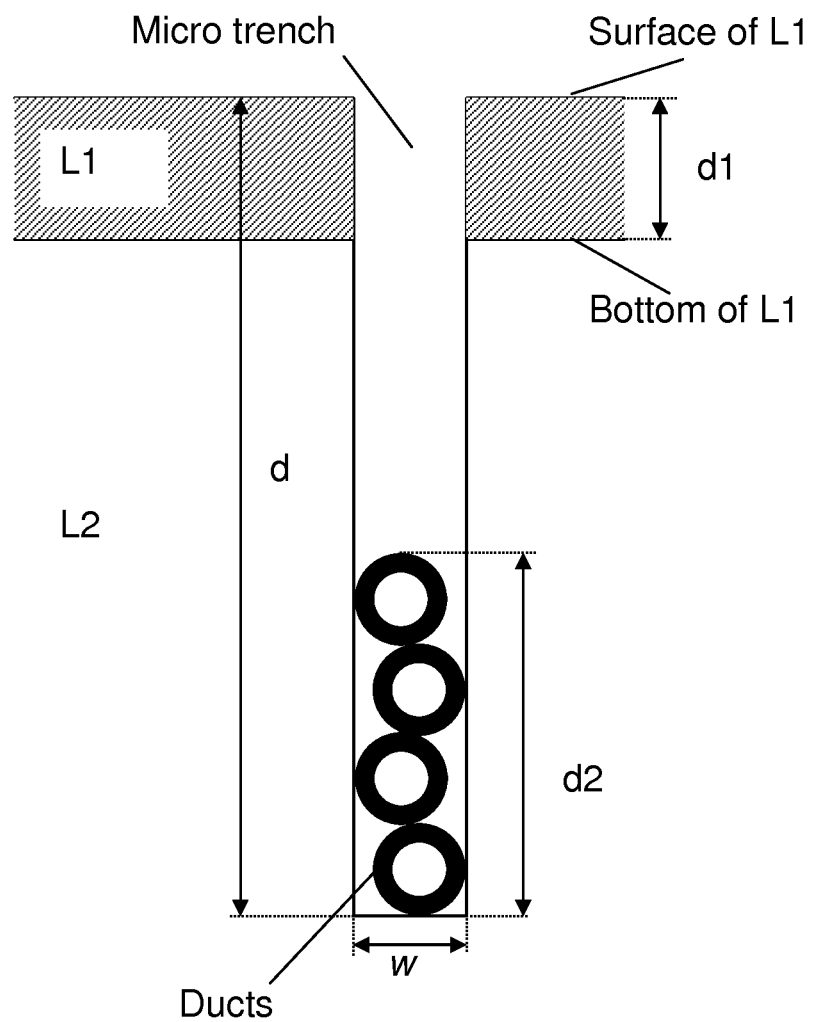

FIGS. 3a and 3b schematically shows a cross section of an area in which a duct is placed in a micro trench. The area in FIGS. 3a and 3b is a three dimensional region of a typical roadway area, wherein the area comprises a first layer L1 being a road layer such as asphalt or concrete, and a second layer L2 being a bearing layer for the first layer L1 and usually consisting of macadam, sand and earth. The second layer L2 is naturally located below the first layer L1 as shown in FIG. 3.

The cutting step involves: cutting the micro trench through the first layer L1 into the second layer L2, which means that the micro trench is cut as shown in FIGS. 3a and 3b. The micro trench is cut so deep that at least one duct/communication cable is placed in the micro trench below the first layer L1 (i.e. all installed ducts/communication cables are placed below the first layer L1). Using the present method all ducts and cables for fibre optic networks can be placed deep enough so that they are safe if the road layer L1 is removed and/or replaced, e.g. when repairing the road.

Thereafter, the at least one duct and/or a communication cable is placed in the micro trench. The duct is a duct arranged to hold "air-blown fibre" (so called EPFU) or fibre cables. The duct/s and/or the communication cable/s are placed in the micro trench so that they are entirely positioned below the first layer L1.

Finally, the micro trench is filled with a suitable filling material so that the road surface is restored. The filling material is sand or any other material with suitable properties. The micro trench is filled with the filling material to a suitable level, and if needed the filling material is thereafter packed with a compactor that fits the width w of the micro trench.

Finally, the micro trench is sealed using a sealing material, such as bitumen, in order to get a water tight sealing. If a water tight sealing is not needed, patching may also be made with cold asphalt which is a simple and cheap method of restoration. A suitable amount of cold asphalt is simply poured and scraped into the micro trench, and thereafter compacted to a smooth and hard surface. Any excess asphalt can then be collected and removed.

The filling step may according to a preferred embodiment involve the steps of:

sealing the micro trench flush to a bottom of the first layer L1 with a first sealing S1; and sealing the micro trench flush to a surface of the first layer L1 with a second sealing S2.

Figure 4:
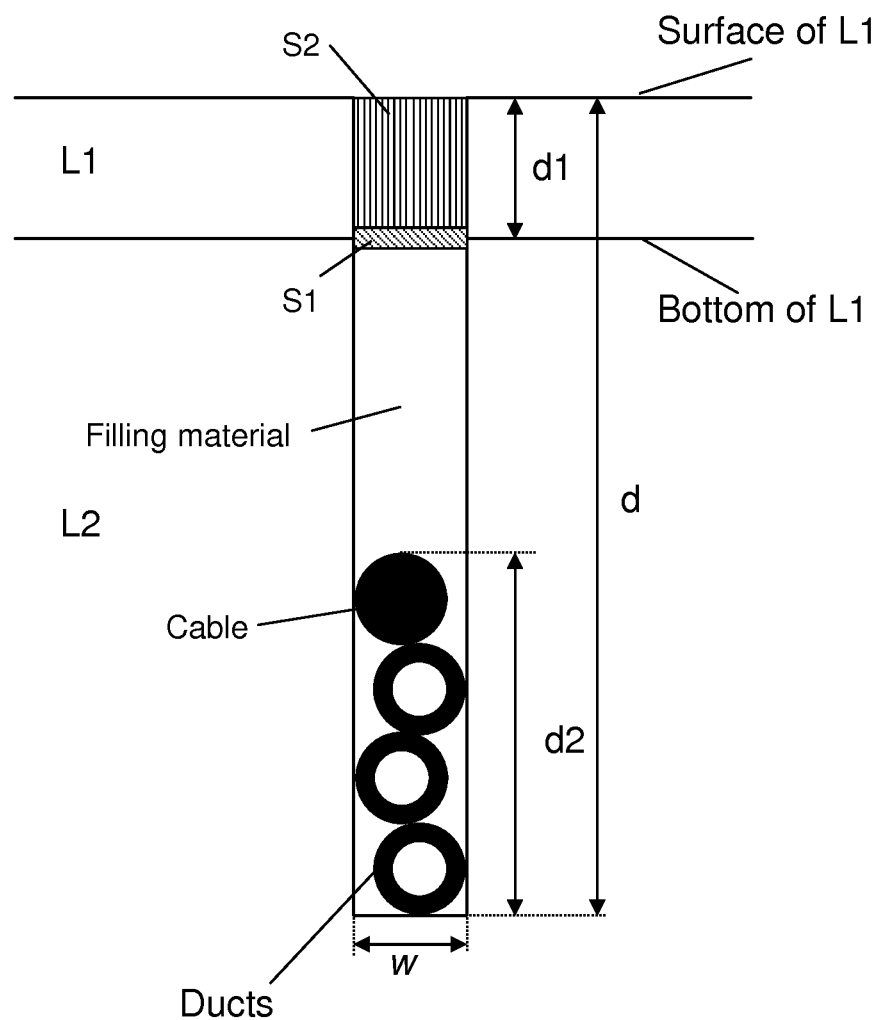
FIG. 4 schematically shows the cross section in FIG. 3, wherein the micro trench is filled with filling material such as sand and sealed with two sealing layers.

FIG. 4 shows the above described embodiment. The surface and the bottom of the first layer L1 are indicated in FIG. 4. In order to obtain a sealed repair with high adhesion it is recommended to pour hot bitumen or bitumen mix when sealing the micro trench. However, other material such as concrete or polymer modified asphalt will work.

The first sealing S1 is put down to seal the micro trench substantially flush with the bottom of the first layer L1 so that the micro trench can be cleaned with a high-pressure washer to remove any residue of sand from the asphalt/concrete edges. After washing, the micro trench may be dried and pre-heated using a propane burner and finally, the micro trench is filled flush with the top surface of the first layer L1 using a suitable sealant such as a hot crack sealant based on bitumen.

According to yet another embodiment, the micro trench is cut with a disc cutter/sawing machine having a diamond coated sawing disc. Such a diamond coated sawing disc can easily saw through even the hardest materials, such as stone and concrete, and has proved very useful in the present application since it provides exceptionally clean cuts when cutting micro trenches. Prior art methods to cut micro trenches, such as using a sawing disc with tungsten carbide teeth, creates small cracks in the edges of the micro trench that will make complete sealing afterwards much harder and more expensive compared the present method.

Figure 8:
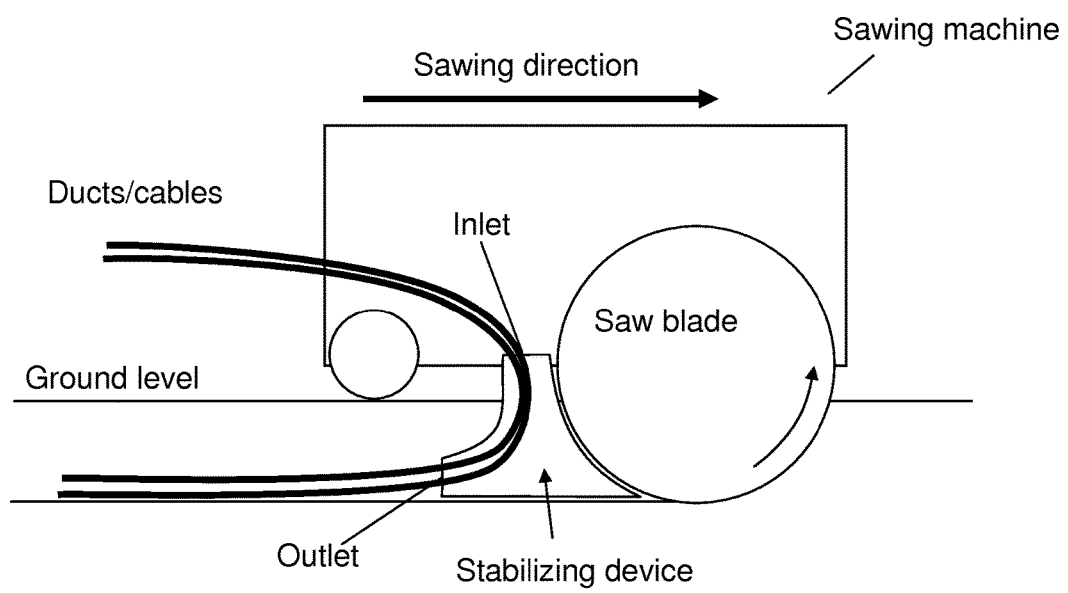
FIG. 8 shows a sawing machine with its sawing blade/disc cutter and a stabilizing device for placing ducts/cables immediately behind the sawing disc.

The micro trench is preferably cut/sawed with a modified so-called road-saw (sawing machine) having a diamond coated sawing disc. To further optimise the performance of the road saw in the present application, the inventors have realised that one or more of the following improvements are useful and should be considered as embodiments:

Change in rotational direction of the sawing disc to so-called "up-cut" for improved transport of cuttings;

Modified cover for the sawing disc and a front outlet to optimise the transport of cuttings and reduce spreading of dust and leave the micro trench clean and ready for laying ducts/cables;

Stabilizing device as shown in FIGS. 8 and 9 with one or more guiding means for ducts/cables immediately after the sawing disc so that micro trenching and placing of ducts/cables can be carried out in one process. In case the stabilizing device has guiding means for a plurality of ducts/cables, these guiding means should be arranged so the outlets from the stabilizing device are placed on top of each other in such a way that the order of the ducts/cables from the inlet into the stabilizing device and into the micro trench is preserved;

Trolley drawn by the road saw with holder for drums for ducts/cables and warning tape with tracking wire; and Servo to keep the sawing disc vertical on uneven surfaces, e.g. when two wheels of the road-saw are on the pavement and two wheels are on the road.

FIG. 8 shows an embodiment using a sawing machine comprising a sawing disc arranged for up-cut. Up-cut is defined as the rotating direction of the sawing disc in relation to the sawing direction as shown by FIG. 8. All known sawing machines have the opposite rotating direction. By changing the rotating direction of the sawing machine to up-cut helps to remove the cut material from the micro trench, thereby providing "clean" micro trenches.

Further, the sawing machine comprises a stabilizing device arranged immediately behind the sawing disc, wherein the stabilizing device has at least one guiding means, such as channels, for guiding the duct/cable when placed in the micro trench immediately after the sawing disc. If a plurality of ducts/cables is placed at the same time, the stabilizing device is arranged to be able to place the ducts/cables in preserved order. This may be achieved by having individual channels for the ducts/cables in the stabilizing device so that the order of the ducts/cables will be maintained through the stabilizing device. Thereby, it is possible before the ducts/cables enter into the stabilizing device to identify which duct/cable will come out on top in the micro trench and thereby making it possible to know which duct/cable to cut for each final location, see FIG. 10.

Generally, the depth d of the micro trench should be larger than the depth of the first layer d1 together with the height d2 of at least one duct or at least one communication cable according to an embodiment, i.e. d>d1+d2 which means that the depth d of the micro trench is larger than the height of the first layer d1 plus the combined height of one ore more ducts and/or communication cables. As can be deduced from FIGS. 3a, 3b and 4, the above mentioned relation holds.

However, costs increase with increased depth d of the micro trench. Therefore, the micro trench should not be deeper than necessary. Normal depth d of the micro trench can be around 400 mm, and unlike the width w of the micro trench, the depth d can often be adjusted continuously while in operation when using a disc cutter. The cutter depth can therefore be reduced gradually as the number of ducts laid in the micro trench is reduced.

Further, the micro trench should not be wider than necessary, since a wider micro trench is more expensive than a narrow micro trench. On the other hand a narrower micro trench can make it more difficult to install the ducts/cables, so there is an optimal width of the micro trench, since e.g. if the micro trench is too narrow, all ducts/cables will be piled on top of each other so that the depth of the top duct/cable will be too shallow.

From the above discussion, the inventors have through tests realised that suitable dimensions for a micro trench should have a depth d between 200-500 mm (and preferably 300-500 mm) and a width w between 10-30 mm (and preferably 15-25 mm) according to an embodiment for installation efficiency and low cost. Further, with these dimensions minimum disruption of traffic is possible when placing ducts/cables since traffic can pass over an open micro trench.

Figure 2:
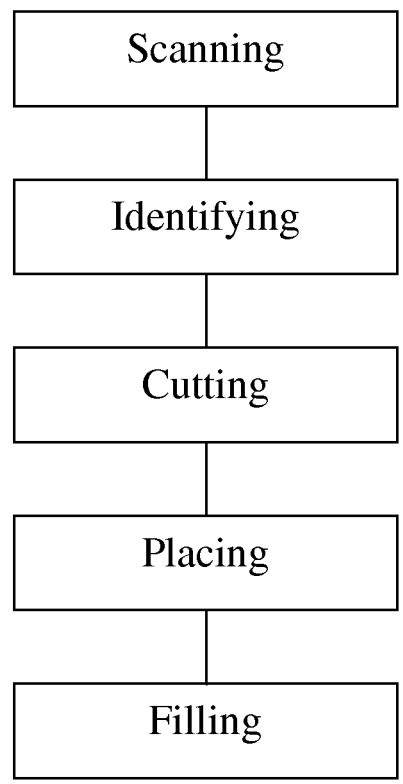
FIG. 2 shows a flow chart of an embodiment of MTT.

Furthermore, with reference to the flow chart in FIG. 2, according to another embodiment, the method for placing at least one duct/communication cable comprises the steps of:

scanning an area by means of a ground penetrating radar; and identifying obstacles in the area using data generated by the ground generated radar, cutting a micro trench in the area through the first layer L1 into the second layer L2;

placing at least one duct/communication cable in the micro trench so that the at least one duct/communication cable is placed below the first layer (L1); and filling the micro trench so as to restore the road surface.

It should be noted that the steps of scanning and identifying are performed before the other steps in the method according to this embodiment.

According to this embodiment, the area is scanned by means of a ground penetrating radar device, such as a GEO-radar or any other suitable equipment.

Thereafter, possible underground obstacles in the area, such as sewer pipes, electrical cables, construction structures, etc. are identified using information generated by the ground penetrating radar device. The scanning and identifying steps means that when performing the subsequent cutting step it may be avoided to accidentally cut/damage obstacles in the area which may result in delay and extra cost in the micro trenching process. After cutting a micro trench in the scanned area, at least one duct and/or a communication cable is placed in the micro trench. Finally, the micro trench is filled with a suitable filling material so that the road surface is restored.

The method may also involve the step of: installing or blowing fibre or fibre cable in one or more ducts if ducts were placed in the micro trench.

It should also be noted that the method described above also may comprise the step of: making one or more branching points connected to the micro trench. Preferably, the branching points may be made by means of a diamond coated core drill or a hand-held sawing machine with a diamond coated sawing chain or disc. As for this described embodiment the method may also comprise the further step of: boring one or more channels from the branching points to one or more houses using controlled or guided boring. It is important that channels are bored below the first layer L1 in the second bearing layer L2. Ducts/cables are thereafter installed in these channels when the drill is pulled back.

Different aspects concerning the layout of micro trenches, branching points and channels, and strategies of cutting, branching, etc, in relation to and incorporated in the present method will be discussed in the following description.

Layout

Figure 5:
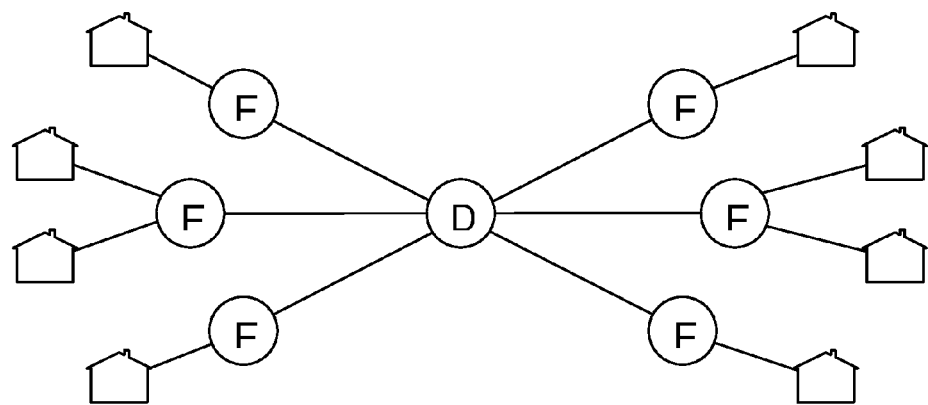
FIG. 5 shows a typical layout of a FTTH network.

FIG. 5 shows a typical logical structure of a Fibre To The Home (FTTH) network in a residential area, where "D" is a distribution node and "F" is a splicing point where larger fibre cables are spliced to smaller ones (or in case of a PON network where optical splitters are placed). The network between a distribution node D and a splicing point F is called distribution network and the network between the splicing point F and the individual homes is called access network. Both the ducts/cables for the distribution network and for the access network can be installed using the present method.

A residential area being constructed with FTTH is normally divided into a number of smaller residential subareas. Somewhere in the residential area or outside of the residential area there must be a site where optical panels and electronics needed to form a so-called distribution node D are housed. The distribution node D can be housed in an existing building or in a small dedicated built building or in a large ground cabinet. Each distribution node D may contain electronics and optical panels for anywhere between a few hundred households up to several thousand households. The size of the area to be built from a single distribution node D can be adjusted within wide limits and depends primarily on practical considerations, such as space in the distribution node D, difficulties with management of a large number of smaller distribution nodes D, etc. This concept can also be adapted for any number of fibres per household.

There are two main types of FTTH networks: point-to-point-networks and point-to-multipoint networks. In a so-called point-to-point-network, the distribution node D contains the other ends of all fibres that originate from the households in the residential area. If e.g. a residential area with 500 households is being equipped with 2 fibres per house, there will be 1000 incoming fibres to the distribution node D. The distribution node D should preferably have a central location in the area being built as shown in FIG. 5.

The fibre structure of a point-to-multipoint-network or a so-called Passive Optical Network (PON) is more or less the same. The difference being that the number of incoming fibres to the distribution node D in this case equals the number of households divided by a factor (e.g. 8, 16, 32, etc.). The examples in the continuing discussion are made assuming that a point-to-point-network is being built. However, described methods also apply to a PON if only the distribution cables are scaled accordingly.

Viewed from the distribution node D, distribution cables extend out to splicing points F in manholes or cabinets. Distribution cables are normally designed for the number of households in the area plus 10% spare so that in the future, newly built buildings easily can be added to the network. In a point-to-point-network, if e.g. a splicing point covers an area with 22 houses and the requirement is two fibres per house, then 48 fibres from the distribution cable are needed. Fibres from the distribution cables are spliced in the splicing points F to fibres from the access cables. These access cables then extend to each one of the houses being connected.

How many houses a splicing point F serves mainly depends on economic issues. If the covered area is too large, this will increase the average length of access cables to the houses, which increases costs. On the other hand, if the covered area is too small the cost for each house will rise in relation to its share of splicing point F and distribution cable. Hence, there is an optimum size to the residential area where the cost is the lowest. The number of houses that would minimise the cost depends mainly on the topography of the residential area and how large the plots of land are on which the houses are standing, but a rule of thumb is that an optimum size is normally somewhere between 16 and 48 houses from each splicing point F.

If micro trenching is carried out using a disc cutter according to an embodiment, the splicing point F should be placed centrally in each residential subarea, with e.g. around 22 houses. The splicing point F can be physically realised in a street cabinet or in a manhole by the roadside. Then, typically 10-12 ducts extend from the ground cabinet or manhole each way along the road. Each of these ducts then extends into each of the houses. Finally, access cables are blown into each of these ducts.

Strategy when Cutting

Usually, residential areas have houses on both sides of a road, and this situation can be tackled in one of two different ways: either micro trench in the roadside on both sides of the road and connect the houses to the closest micro trench, or micro trench on only one side of the road or in the middle of the road and connect houses on both sides to this micro trench.

However, to minimise the number of micro trenches across the road, start to micro trench to a boundary between two properties (houses) on the opposite side of the road according to an embodiment. Then place a duct/channelling tube in that micro trench to each one of the two properties. In this way, a micro trench across the road need only be made for every second property on the opposite side of the road. Micro trenching across the road for every second property then this will be a cheap and cost effective method.

Branching Off a Main Trench

Figure 10:
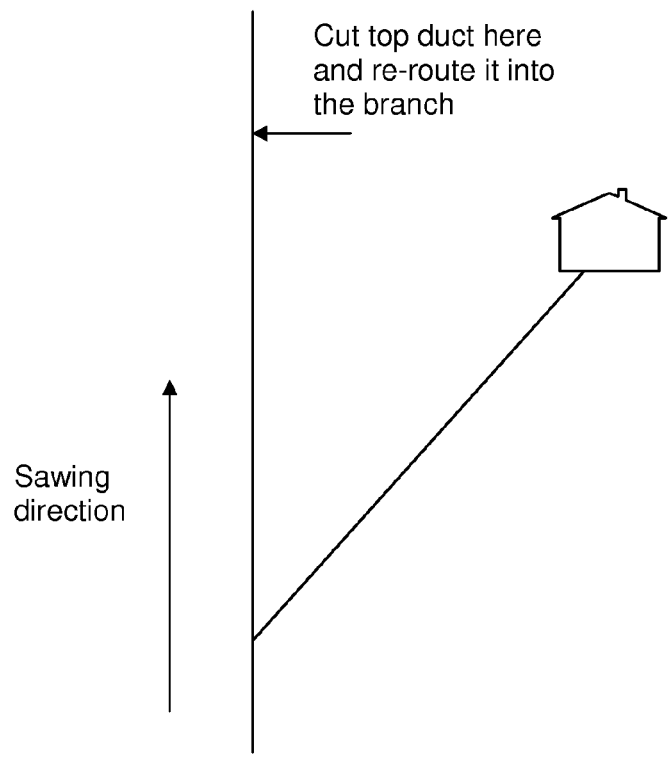
FIG. 10 shows in detail where to cut the top duct so that it will be long enough to reach its final destination.

Branching off from a main micro trench (a main micro trench is defined as a micro trench along a road) can be carried out in a number of ways. The branches may be sawn either before as shown in FIG. 6 or after the main micro trench is sawn. Both methods are best done at about a 45° angle from the main micro trench in order to obtain a large radius curve for the ducts/tubing. The branches may cross the location of the main micro trench or go "flush" with the main trench. When the main micro trench is sawed and the ducts/channelling tubes are laid it is easy to one by one route one of the uppermost tubes through each of the sawed branches up to each residence, as shown in FIG. 10 and to the right in FIG. 6.

An alternative method of branching is to first bore a hole at each branching point with a suitably sized core drill. The main micro trench can then be cut along all these holes in the same manner as described above as shown in FIG. 7. This method is suited both to making the house connections with a micro trench cut in the way described above as well as making house connections with controlled boring.

An alternative method of branching is to first make a hole at each branching point. The holes may be made using a suitably sized core drill (for a round hole) or using a hand tool with a diamond cutting blade or chain (for a square hole). The main micro trench can then be cut along all these holes in the same manner as described above and as shown in FIG. 7. This method is suited both to making the house connections with a micro trench cut in the way described above as well as making house connections with controlled boring. Controlled boring is sometimes preferred for making the house connections, because it avoids (e.g. goes under) obstacles like fences, hedges, trees, etc. However, another piece of expensive machinery (core drill) is needed at the installation site.

Finally, it should be understood that the present invention is not limited to the embodiments described above, but also relates to and incorporates all embodiments within the scope of the appended independent claims.

The invention claimed is:

1. A method for controlling a system for sawing trenches in an area of a road, said system comprising:
   a server unit having computer means, wireless communication means and a first data base, said first data base including positioning data and a plurality of work orders, wherein said work orders are related to said positioning data; and
   a sawing machine having computer means and wireless communication means, and being arranged for sawing trenches in an area of said road, said sawing machine comprising a saw blade arranged to saw a trench in said area through a road layer into a bearing layer for said road layer, and a stabilizing device positioned immediately behind said saw blade and being arranged to place a plurality of ducts/communication cables in said trench by means of guiding means comprised in said stabilizing device;
   said method comprising the steps of:
   transmitting, by said server unit, using said wireless communication means, a first data flow (A) comprising a first work order to said sawing machine;
   receiving, by said sawing machine, using said wireless communication means said first data flow (A) comprising said first work order; and
   sawing, by said sawing machine, at least one trench through said road layer into said bearing layer in said area of said road according to said first work order;
   placing, by said sawing machine, the plurality of ducts/communication cables in said trench.

2. Method according to claim 1, wherein said first data flow (A) further comprises position data related to said first work order.

3. Method according to claim 1, wherein said sawing machine further comprises a positioning receiver, and said method further comprises the steps of:
   transmitting, by said sawing machine, a second data flow (B) comprising positioning data for said sawing machine to said server unit, and
   updating said first data base with said second data flow (B).

4. Method according to claim 3, wherein said second data flow (B) further comprises receipt data corresponding to said first work order, said receipt data being related to said positioning information.

5. Method according to claim 3, wherein said second data flow (B) further comprises operational data for said sawing machine.

6. Method according to claim 3, further comprising the step of:
   generating and/or modifying a first work order based on said second data flow (B).

7. Method according to claim 1, wherein said sawing machine further comprises a second data base including information from said first data base.

8. Method according to claim 1, wherein said sawing machine further comprises reading means and a saw blade having mechanical coding means, and said method further comprises the step of:
   checking whether said saw blade is a valid saw blade or not for use with said sawing machine.

9. Method according to claim 1, wherein said system further comprises a GEO seamier having communication means, and said method further comprises the steps of:
   transmitting, by said server unit, a third data flow (C) comprising a second work order to said GEO scanner,
   scanning, by said GEO scanner, said area according to said second work order,
   transmitting, by said GEO scanner, a fourth data flow (D) comprising scanning information about said area to said server unit, and
   updating said first data base with said fourth data flow (D).

10. Method according to claim 9, wherein said GEO scanner further comprises a positioning receiver, and said fourth data flow (D) further comprises receipt data corresponding to said second work order and positioning data for said GEO scanner, wherein said positioning data is related to said scanning information and said receipt data.

11. Method according to claim 9, wherein said GEO scanner further comprises a third data base including information from said first data base.

12. Method according to claim 9, further comprising the step of:
   generating and/or modifying a first work order based on said fourth data flow (D).

13. Method according to claim 1, wherein said system further comprises an office client having communication means, and said method further comprises the steps of:
   generating and/or modifying, by said office client, a first and/or a second work order, and —transmitting, by said office client, a fifth data flow (E) comprising said generated and/or modified first and/or said second work order to said sawing machine and/or said GEO seamier via said server unit.

14. Method according to claim 13, wherein said method further comprise the step of: —transmitting, by said server unit, a sixth data flow (F) comprising said receipt data from said sawing machine and/or GEO scanner to said office client.

15. Method according to claim 1, wherein said first data base further comprises spatial/map data for said area.

16. A system for sawing trenches in an area of a road, said system comprising a server unit having computer means, communication means and a first data base, said first data base including positioning data and a plurality of work orders, wherein said work orders are related to said positioning data; and a sawing machine having computer means and wireless communication means, and being arranged for sawing trenches in an area of said road, said sawing machine comprising a saw blade arranged to saw a trench in said area through a road layer into a bearing layer for said road layer, and a stabilizing device positioned immediately behind said saw blade and being arranged to place a plurality of ducts/communication cables in said trench by means of guiding means comprised in said stabilizing device; wherein
   said server unit is arranged for transmitting, using said wireless communication means, a first data flow (A) comprising a first work order to said sawing machine;
   said sawing machine is arranged for receiving, using said wireless communication means, said first data flow (A) comprising said first work order; and
   said sawing machine is arranged for sawing trenches in said area of said road through said road layer into said bearing layer according to said first work order.

17. System according to claim 16, wherein said first data flow (A) further comprises position data related to said first work order.

18. System according to claim 16, wherein said sawing machine further comprises a positioning receiver, and said sawing machine is arranged to transmit a second data flow (B) to said server unit, said second data flow (B) comprising positioning data for said sawing machine, and said server unit is arranged to update said first data base with said second data flow (B).

19. System according to claim 18, wherein said second data flow (B) further comprises operational data and/or receipt data corresponding to said first work order, said receipt data being related to said positioning information.

20. System according to claim 16, wherein said sawing machine further comprises a second data base including information from said first data base.

21. System according to claim 16, wherein said sawing machine further comprises reading means and a saw blade having mechanical coding means, and said sawing machine being arranged to check whether said saw blade is a valid saw blade or not for use with said sawing machine.

22. System according to claim 16, further comprising a GEO scanner having communication means, and said GEO scanner being arranged to:
receive a third data flow (C) comprising a second work order from said server unit,
scan said area according to said second work order, and
transmit a fourth data flow (D) comprising scanning information about said area to said server unit.

23. System according to claim 22, wherein said GEO scanner further comprises a positioning receiver, and said fourth data flow (D) comprises receipt data corresponding to said second work order and positioning data for said GEO scanner, wherein said positioning data is related to said scanning information and said receipt data.

24. System according to claim 22, wherein said GEO scanner further comprises a third data base including information from said first data base.

25. System according to claim 16, further comprising an office client having communication means and being arranged to:
generate and/or modify a first and/or a second work order, and —transmit a fifth data flow (E) comprising said generated and/or modified first and/or said second work order to said sawing machine and/or said GEO scanner via said server unit.

26. System according to claim 25, wherein said server unit is further arranged to:
transmit a sixth data flow (F) comprising said receipt data from said sawing machine and/or GEO seamier to said office client.

27. System according to claim 16, wherein said first data base further comprises spatial/map data for said area.

* * * * *